INVENTORS
RICHMOND D. BELCHER
DAVID L. GRIFFITH
RICHARD G. SACHER
BY Samuel Kane
ATTORNEY

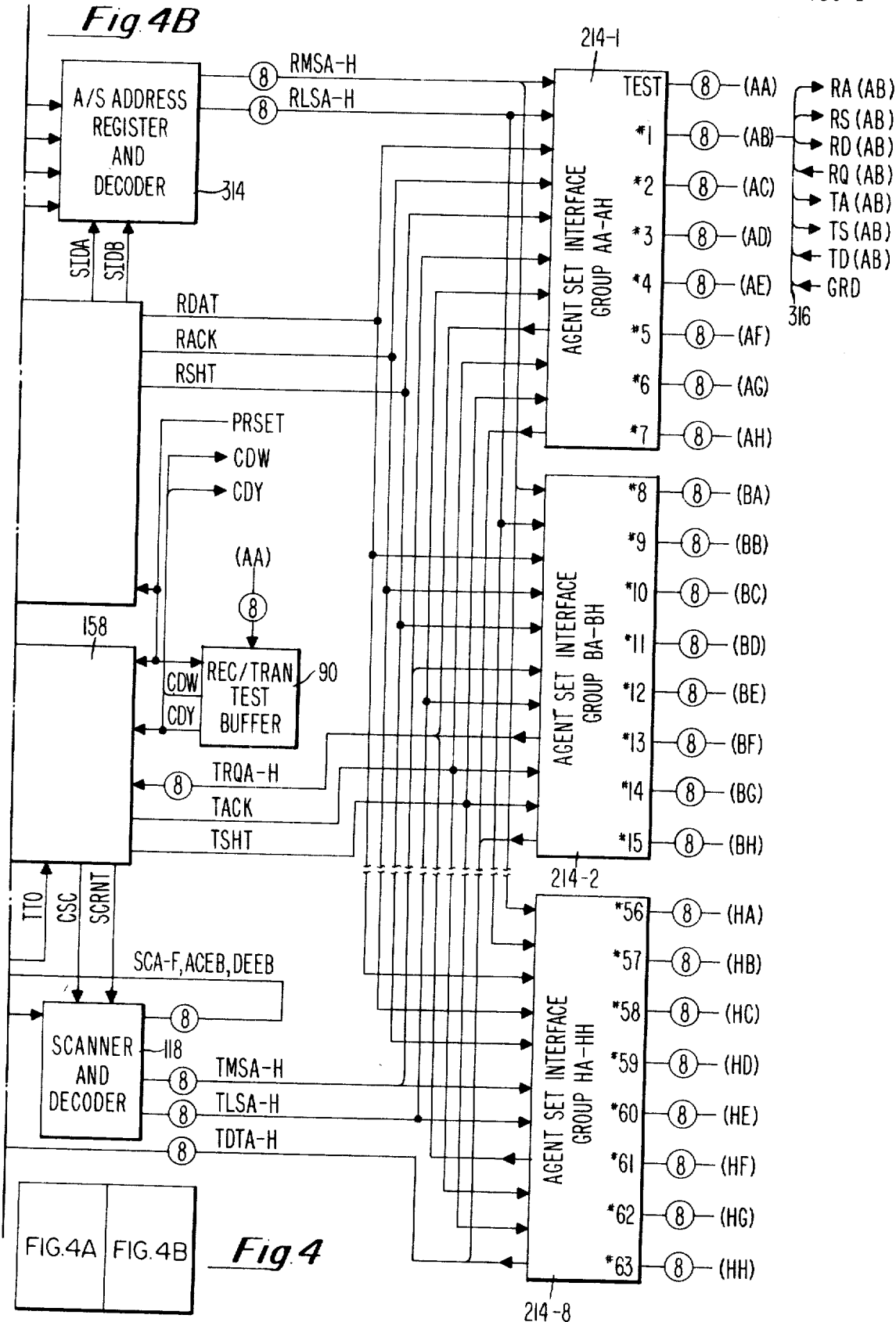

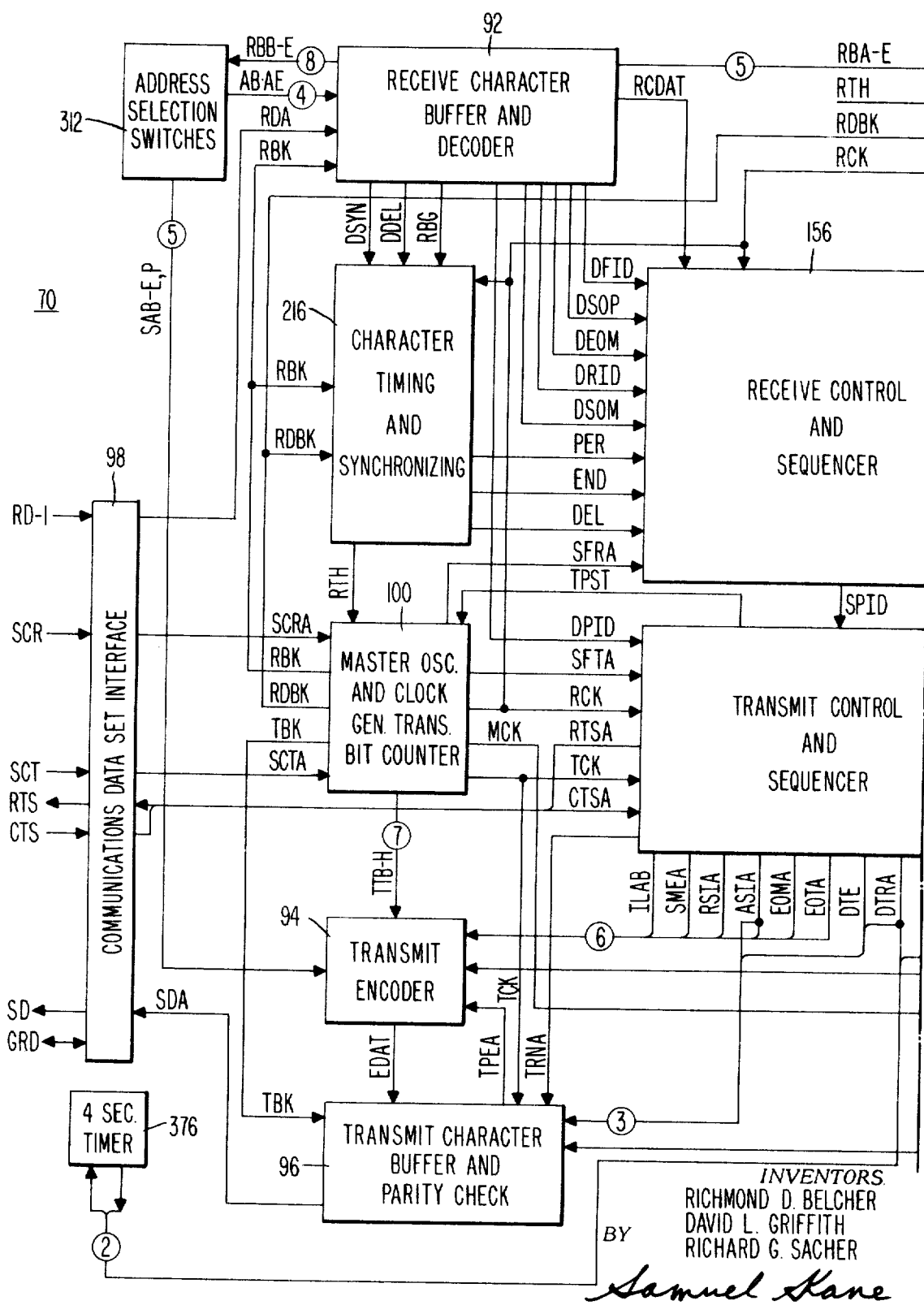

| MODE | SEARCH FOR | | ACTION UPON DETECTION | |
|---|---|---|---|---|
| | NORMAL | ABNORMAL | GO TO MODE | OTHER ACTION |
| 0 IDLE | SYN<br>SOM<br>POL | <br><br><br>PARITY ERROR<br>OTHER | 0<br>1<br>5<br>0<br>0 | |
| 1 SOM | ADDRESS 0<br>RSC ADDRESS<br>POL | <br><br><br>PARITY ERROR<br>OTHER | 2<br>2<br>5<br>0<br>0 | |
| 2 ID1 | AGENT SET ADDRESS<br>POL | <br><br>PARITY ERROR<br>OTHER | 3<br>5<br>0<br>0 | SELECT AGENT SET |
| 3 ID2 | DATA | <br>PARITY ERROR | 4<br>0 | |
| 4 MESSAGE | EOM<br>POL<br>DEL<br><br>OTHER | <br><br><br>SOM<br>SYN<br>PARITY ERROR<br><br>OTHER | 0<br>5<br>4<br>1<br>4<br>0<br>4 | <br><br><br>PASS 0000000 TO AGENT SET<br><br>PASS CHARACTER TO AGENT SET WITH ERROR<br>PASS CHARACTER TO AGENT SET |
| 5 POLL | RSC ADDRESS<br>OTHER | <br>OTHER | PREVIOUS<br>PREVIOUS | ACTIVATE TRANSMITTER |
| ALL MODES | 7 SYN ANY ∅ | | 0 | RESET CHARACTER SYNCH. COUNTER |

*Fig.18*

Nov. 10, 1970   R. D. BELCHER ET AL   3,539,998
COMMUNICATIONS SYSTEM AND REMOTE SCANNER AND CONTROL UNITS
Filed July 12, 1967   17 Sheets-Sheet 17

| BITS | | | | b6 →<br>b5 →<br>b4 → | 0<br>0<br>0 | 0<br>0<br>1 | 0<br>1<br>0 | 0<br>1<br>1 | 1<br>0<br>0 | 1<br>0<br>1 | 1<br>1<br>0 | 1<br>1<br>1 |
|---|---|---|---|---|---|---|---|---|---|---|---|---|
| b3 | b2 | b1 | ROW ↓ | COLUMN → | 0 | 1 | 2 | 3 | 4 | 5 | 6 | 7 |
| 0 | 0 | 0 | 0 | | | | | | | | | |
| 0 | 0 | 1 | 1 | | | | | | | | | |
| 0 | 1 | 0 | 2 | | | | | | | SOM<br>SOM | | |
| 0 | 1 | 1 | 3 | | | | | | | | | |
| 1 | 0 | 0 | 4 | | | | | | | PEI | | SYN<br>SYN |
| 1 | 0 | 1 | 5 | | | | | | | | | |
| 1 | 1 | 0 | 6 | | | | | FID | | EOM<br>EOM | | |
| 1 | 1 | 1 | 7 | | | | | | | POL<br>EOT | | DEL |

TRANSMISSION SEQUENCE: b1 b2 b3 b4 b5 b6 b7 b1 — LEAST SIGNIFICANT BIT b6 — MOST SIGNIFICANT BIT b7 — ODD PARITY BIT (NOT SHOWN IN TABLE)

UPPER DESIGNATION — RECEIVE TERMINAL SENSED CHARACTERS

LOWER DESIGNATION — TRANSMIT TERMINAL GENERATED CHARACTERS

*Fig. 19*

INVENTORS.
RICHMOND D. BELCHER
DAVID L. GRIFFITH
RICHARD G. SACHER

BY *Samuel Kane*
ATTORNEY

United States Patent Office 3,539,998
Patented Nov. 10, 1970

---

3,539,998
COMMUNICATIONS SYSTEM AND REMOTE SCANNER AND CONTROL UNITS
Richmond D. Belcher, Wayne, David L. Griffith, Media, and Richard G. Sacher, King of Prussia, Pa., assignors to Burroughs Corporation, Detroit, Mich., a corporation of Michigan
Filed July 12, 1967, Ser. No. 652,759
Int. Cl. H04j 3/06
U.S. Cl. 340—172.5                                                  10 Claims

ABSTRACT OF THE DISCLOSURE

A communications terminal unit having a receive section and a transmit section provides communication service to a data processing system and to a number of devices which in one form are input/output devices. One or more of the inventive communications terminal units may be used in a given communications system, and each communications terminal unit has address capacity to service a number of the input/output devices. In the illustrated embodiment of the invention the input/output devices are agent sets.

Receive data transmitted from the data processing system is addressed to a specific communications terminal unit and to a specific input/output device served by that communications terminal unit. Each communications terminal unit. monitors all data on the receive channel and accepts only those messages that are properly addressed to it. The communications terminal unit recognizes its address and the address of the specific input/output device and routes the message to the addressed input/output device.

The data processing system may send poll messages at any time, generally addressed to a specific communications terminal unit. Receipt of a properly addressed poll message by a communications terminal unit causes its transmit section to be activated and to service all its input/output devices that are awaiting transmit service to the data processing system.

BACKGROUND OF THE INVENTION

This invention relates generally to communications systems and more particularly to a communications terminal for receiving data from a data processing system, distributing the data to one or more devices and controlling the transmission of data from the devices to the data processing system. While not limited thereto, the communications terminal unit of the present invention finds special application as a remote scanner and control unit for providing communication service to a data processing system in the form of a digital omputer and to input/output devices in the form of agent sets of the kind described and claimed in a copending application of Murray Lasoff, Irwin R. Holmes and Thomas J. Dodds, Jr., Ser. No. 557,194, filed June 13, 1966 and assigned to the same assignee as the instant invention, and therefore the invention will be described hereinafter in connection with such use.

SUMMARY OF THE INVENTION

One of the objects of the present invention is to provide improvements in communications systems.

Another object of the invention is to provide improvements in data handling techniques.

Another object of the invention is to provide improvements in communications terminals for handling coded data.

A further object of the invention is to provide a communications terminal for receiving data from a data processing system and distributing the data to at least one of a number of devices.

Another object of the invention is to provide a communications terminal which can control the transmission of data from a number of devices to a data processing system.

More specifically, it is a further object of the invention to provide a communications terminal for receiving data from a data processing system, distributing the data to at least one of a number of input/output devices destined to receive it, and controlling the transmission of data from the input/output devices to the data processing system.

A further object of the invention is to provide a communications terminal which is capable of being operated in the full duplex mode so that it can transmit data from a data processing system to a first input/output device and simultaneously transmit data from a second input/output device to the data processing system.

Another more specific object of the invention is to provide a communications terminal which can synhronize at any time to the transmission of data from a data processing system, in response to a coded instruction to synchronize, received from the data processing system.

In accordance with the above objects, and considered first in one of its broader aspects, a communications terminal in accordance with the invention for receiving information from a data processor and routing the information to a selected one of a plurality of devices each requiring at least a receive acknowledge signal for receiving the information may comprise a storage means for receiving an address character code from the data processor which contains the coded address of the seleted device. Means is provided for decoding the character code and control means is provided which is operative to provide a preliminary acknowledge signal. Circuit means is connected to receive the output of the decoding means and the preliminary acknowledge signal for generating and transmitting the receive acknowledge signal to the selected device, and further means is provided for receiving and routing information from the data processor to the selected device.

In another aspect of the invention a communications system may comprise a data processor, a plurality of devices each requiring at least a transmit acknowledge signal for transmitting data to the data processor and each having a request line which is activated when the device has been conditioned to transmit, and a plurality of communications terminals each for controlling the transmissions of a group of the devices. Each communications terminal may comprise storage means for receiving two character codes from the data processor. One of the codes is a poll code and the other of the codes contains the address of the communications terminal. The communications terminal further includes means for decoding the character codes, control means which is activated by the output of the decoding means for initiating a request-to-send signal to the data processor and which is responsive to the receipt of a clear-to-send signal from the data processor for sensing the status of the request lines and for generating a preliminary signal if a request line is found to be activated. The communications terminal is further provided with circuit means which cooperates with the preliminary signal for generating and transmitting the transmit acknowledge signal to the requesting device whose request line is activated, and with further means for routing transmit data from the requesting device to the data processor.

The invention will be more clearly understood when the following detailed description of the preferred embodiment thereof is read in conjunction with the accompanying drawings which are described below.

BRIEF DESCRIPTION OF THE DRAWINGS

FIGS. 4A and 4B, when placed together as shown in FIG. 4, constitute a block diagram of the remote scanner and control unit;

FIG. 18 is a tabulation of the various modes of operation of the receive unit of the remote scanner and control unit, which indicates the response of the remote scanner and control unit to the detection of various character codes; and FIG. 19 is a tabulation of control character codes utilized with the invention.

DESCRIPTION OF THE PREFERRED EMBODIMENT

Introduction

Figure 1:
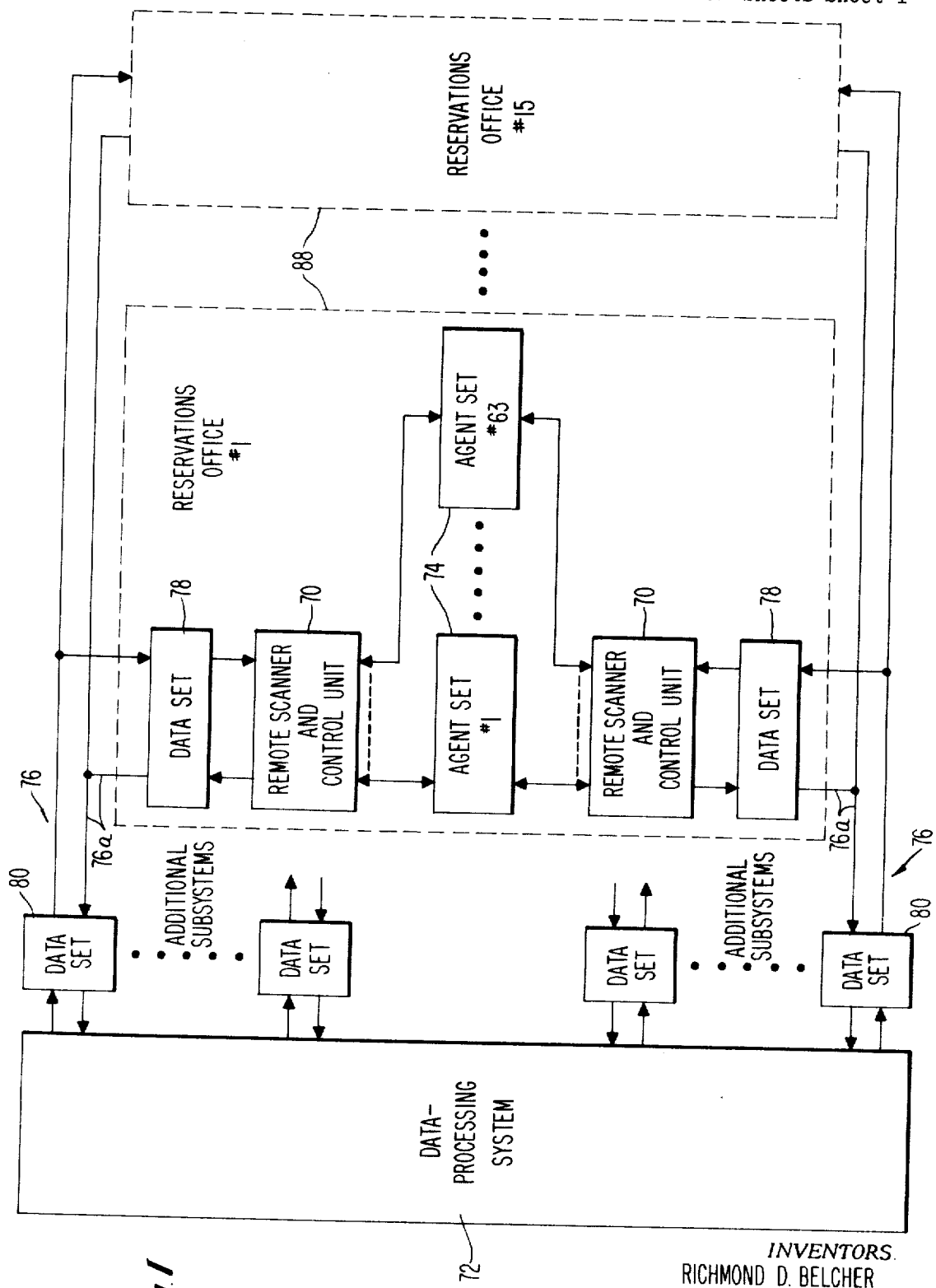
FIG. 1 is a block diagram of an expandable communications system embodying the invention.

The remote scanner and control unit 70 (FIG. 1) of the present invention, hereafter also designated "RSC 70" or "RSC," is a terminal unit designed to allow communications between a data processing system 72 and several devices 74. In the illustrated embodiment of the invention, the devices 74 are input/output devices such as agent sets, for example, and the data processing system 72 is a digital computer. In FIG. 1 which illustrates one particular communications system, each RSC 70 is shown connected to a full duplex multipoint channel or line 76 via a data set 78. The data sets 78 are Bell System 201B1 Type Dataphone Units, or equivalent. Each channel 76 is coupled to the data processor 72 through a similar data set 80. The use of data sets, or other equivalent, between the data processor 72 and the remote scanner and control units 70 is exemplary and is not to limit the use of the invention, since communication between the data processor 72 and one or more remote scanner and control units 70 may be direct in some communications systems. Accordingly, the data sets 78 and 80 may also be considered to be parts of the data processor 72.

The RSC 70 may operate in a full duplex mode, being comprised of a receive unit 84 (FIG. 2) and a transmit unit 86. The receive unit 84 may allow one agent set 74 to receive information from the computer 72 at the same time that the transmit unit 86 allows a second agent set 74 which is connected to the same RSC 70 to transmit information to the computer 72.

One or more RSC's 70 may be connected via associated data sets 78 to each full dupex line 76. As shown in FIG. 1, the system is illustratively expandable to include 15 RSC's on each line 76, each RSC 70 located, in this example, at an airline reservations office 88, and with each RSC 70 illustratively servicing up to 63 of the agent sets 74. The agent sets are identified and numbered individually from #1 to #63. It is understood that the number of RSC's 70 and the number of agent sets 74 shown are illustrative only, and are not to limit the use or arrangement of the invention. The expansion capability indicated in FIG. 1 may be limited in certain applications by communication restrictions on the number of stations on a multipoint line and queueing, line loading, and grade of service considerations.

As indicated further in FIG. 1, preferably each agent set 74 can be serviced by two RSC's 70 employing separate parallel circuits. This parallel circuit approach provides automatic "load sharing" during normal operation and continuous service in the event either one of the circuits should become inoperable. Additional confidence is provided by a test buffer 90 (FIGS. 2 and 4B) incorporated in each RSC 70 as an aid to maintenance, diagnostic, and error recovery procedures.

Information sent by the central processor 72 to a particular RSC 70 is received by the RSC and placed into a receive character buffer which is part of a receive character buffer and decoder block 92 (FIG. 4A). The contents of the receive character buffer in block 92 is continually examined for control characters. Certain control characters will initialize a control sequence within the RSC 70 such that the next succeeding data characters after a particular control character are interpreted uniquely. This method is used to control the data path of a message through the RSC 70 to a particular agent set 74.

Each message is prefaced by a character header which may consist of one or more characters. In the illustrative mode of operation, the header is a three-character header consisting of a start-of-message character SOM (FIG. 19), an RSC address character ID1 and an agent set address character ID2. The receive message data characters are directed by the addressed RSC 70 to the addressed agent set 74 until an end-of-message character EOM or parity error is detected and the transfer control is terminated.

A two-character poll message sequence consisting of a start-of-poll character POL and an RSC address character ID1 is used to activate the transmit portion 86 of the selected or addressed RSC. The activated transmit unit 86 turns on the carrier signal of the data set 78 and, in an illustrative mode of operation, transmits to it three synchronous idle characters SYN. This is followed by either a message from an agent set 74 or, if there are no such messages, by an end-of-transmission character EOT. A transmit encoder 94 (FIG. 4A) in the RSC 70 generates the three-character (SOM, ID1, ID2) header and an end-of-message suffix character EOM for each agent set message. Transmit data from the agent sets 74 are transferred through a character buffer in a transmit character buffer and parity check block 96 (FIG. 4A) in the RSC 70 where character parity is checked.

Figure 3:
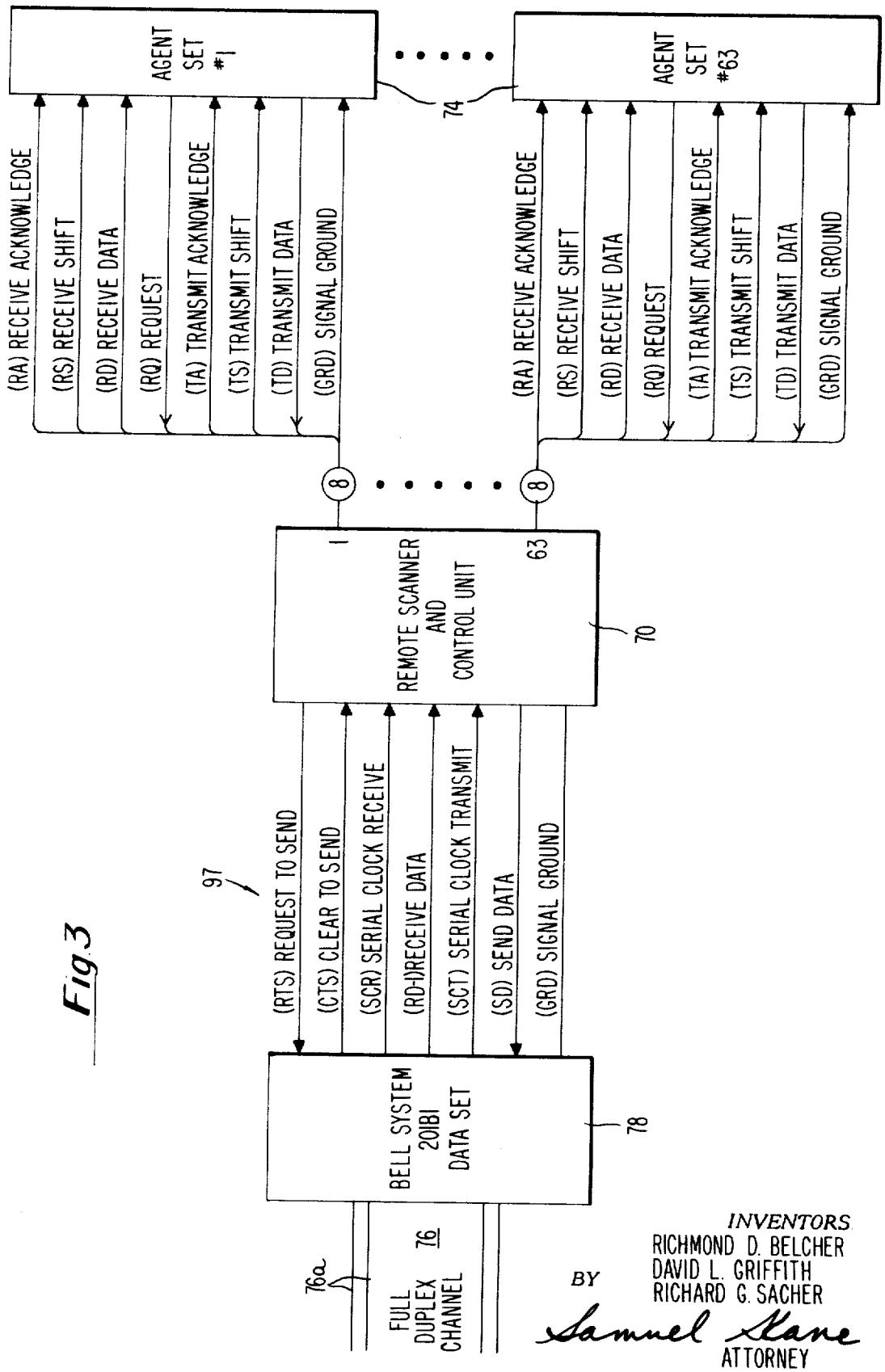
FIG. 3 is a block diagram illustrating the interfacing lines of the remote scanner and control unit.

As shown in FIG. 3, the RSC 70 interface with the data set 78 consists of six lines plus a ground line while the RSC 70 interface with each agent set 74 consists of seven lines plus a ground line. The manner in which the lines are used during operation is briefly described below.

Messages from the computer 72 which are destined for agent sets 74 are sent to the receive unit 84 of the RSC 70 via the data sets 80 and 78 and the receive data line RD–1, in conjunction with the serial clock receive pulses SCR (FIG. 5) from the data set 78. As indicated previously, each message is preceded by a three-character header containing a start-of-message character SOM, an RSC address character ID1 and an agent set address character ID2. When an RSC 70 determines that it is being addressed, it decodes the agent set address character and functionally connects that agent set 74 to the receive data line RD–1 of the data set 78.

Three lines are used in transferring data from the receive unit 84 of the RSC 70 to an agent set 74. The receive acknowledge lines RA (FIG. 3) are run individually to each agent set 74, so that the RSC 70 can notify the proper agent set 74 to accept its message. The receive shift line RS and receive data line RD are lines which are common to all the agent sets 74 serviced by a particular RSC 70.

In messages going to an agent set 74, the RSC 70 first raises its receive acknowledge line RA. This line remains raised until the last character is transmitted, except that during the transmission of an FID character, which will be explained later on, the RA line is dropped.

Figure 16:
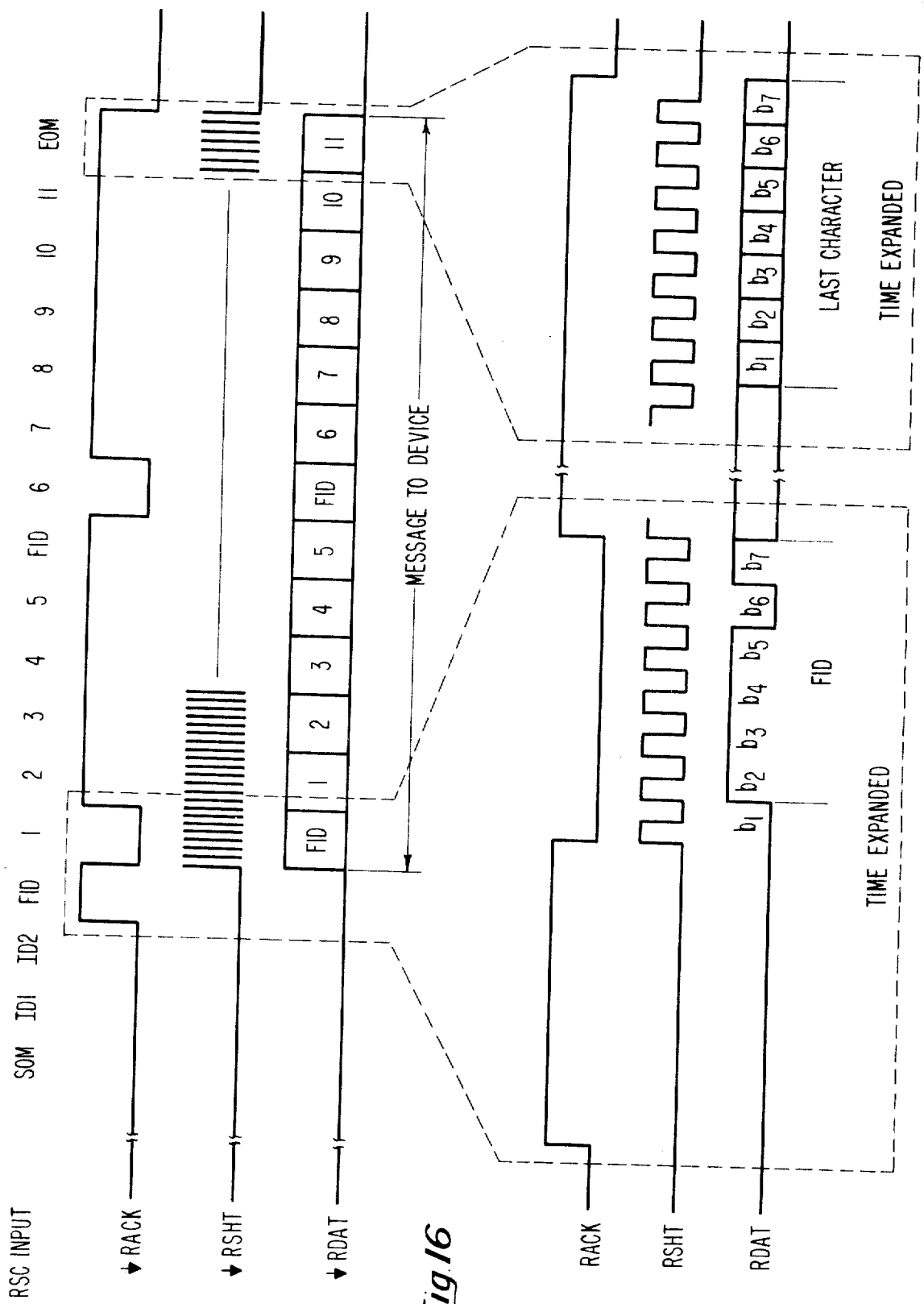
FIG. 16 shows timing details of a message going to a device, or agent set, from the data processor via the remote scanner and control unit.

Pulses from the RSC 70 sent over the receive shift line RS are synchronous with the serial clock pulses SCR from the data set 78. A message coming into the RSC 70 over the receive data line RD–1 at the data set interface is sent to an agent set 74 over the other receive data line RD at the agent set interface in synchronism with the receive shift pulses RS. Timing details for messages going to an agent set 74 are shown in FIG. 16.

Figure 2:
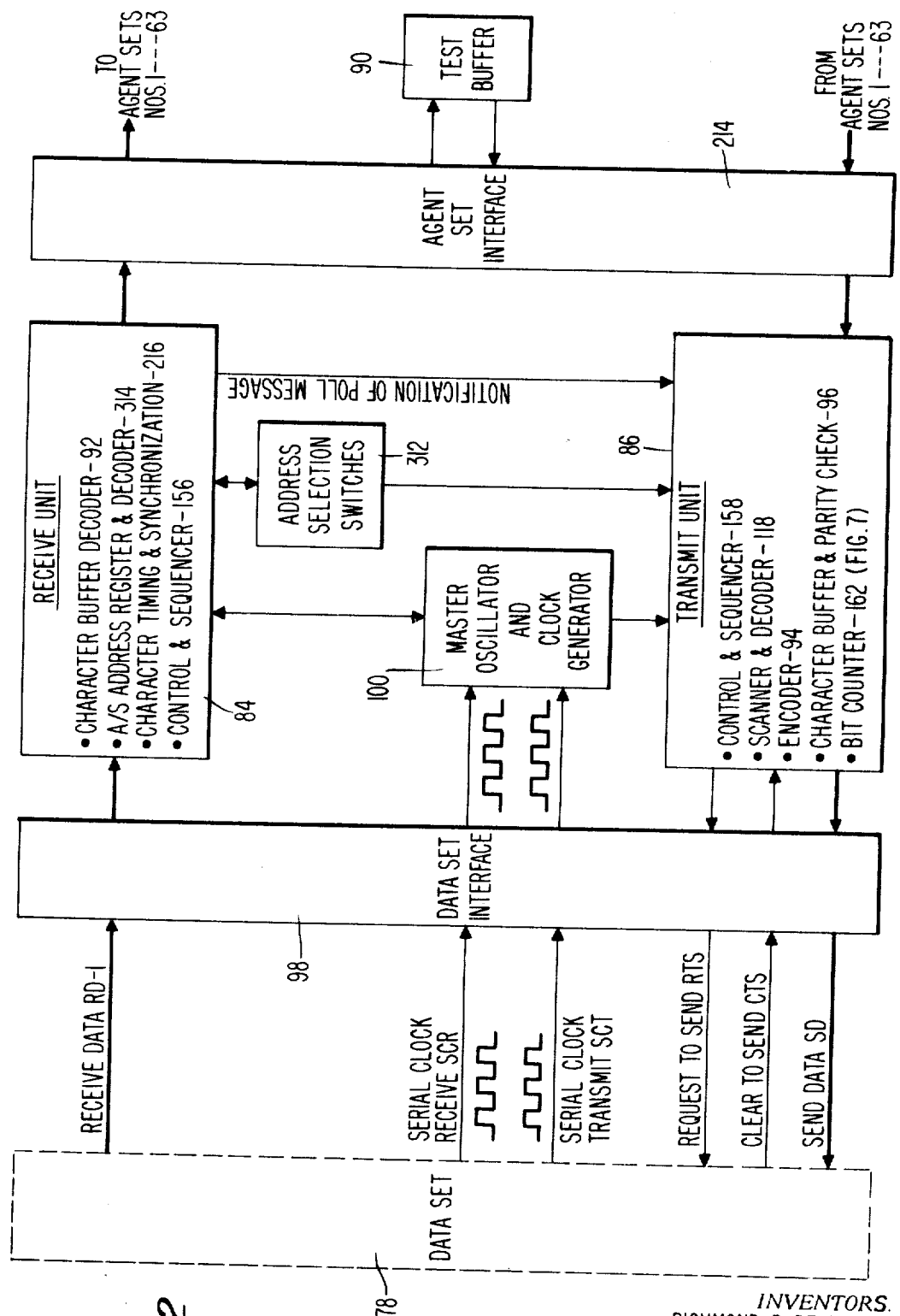
FIG. 2 is a simplified block diagram of the remote scanner and control unit of the invention.

The RSC transmit unit 86 interfaces with the data set 78 via the four lines RTS, CTS, SCT and SD (FIGS. 2 and 3). Two of the lines, RTS and CTS, to the data set 78 are involved in setting up transmissions to the computer 72.

Before any agent set 74 which desires to transmit can have its message sent to the computer 72, its associated RSC 70 must be authorized to transmit by a poll message from the computer 72 via the data sets 80 and 78. When this poll message is received by an RSC 70, its transmit unit 86 is activated and it raises its request-to-send line RTS (FIGS. 2 and 4A). Then, when a clear-to-send signal CTS is received from the data set 78, the RSC 70 prepares to transmit agent set messages. These messages are transmitted to the computer 72 via the send data line SD in synchronism with the serial clock transmit pulses SCT.

Figure 17:
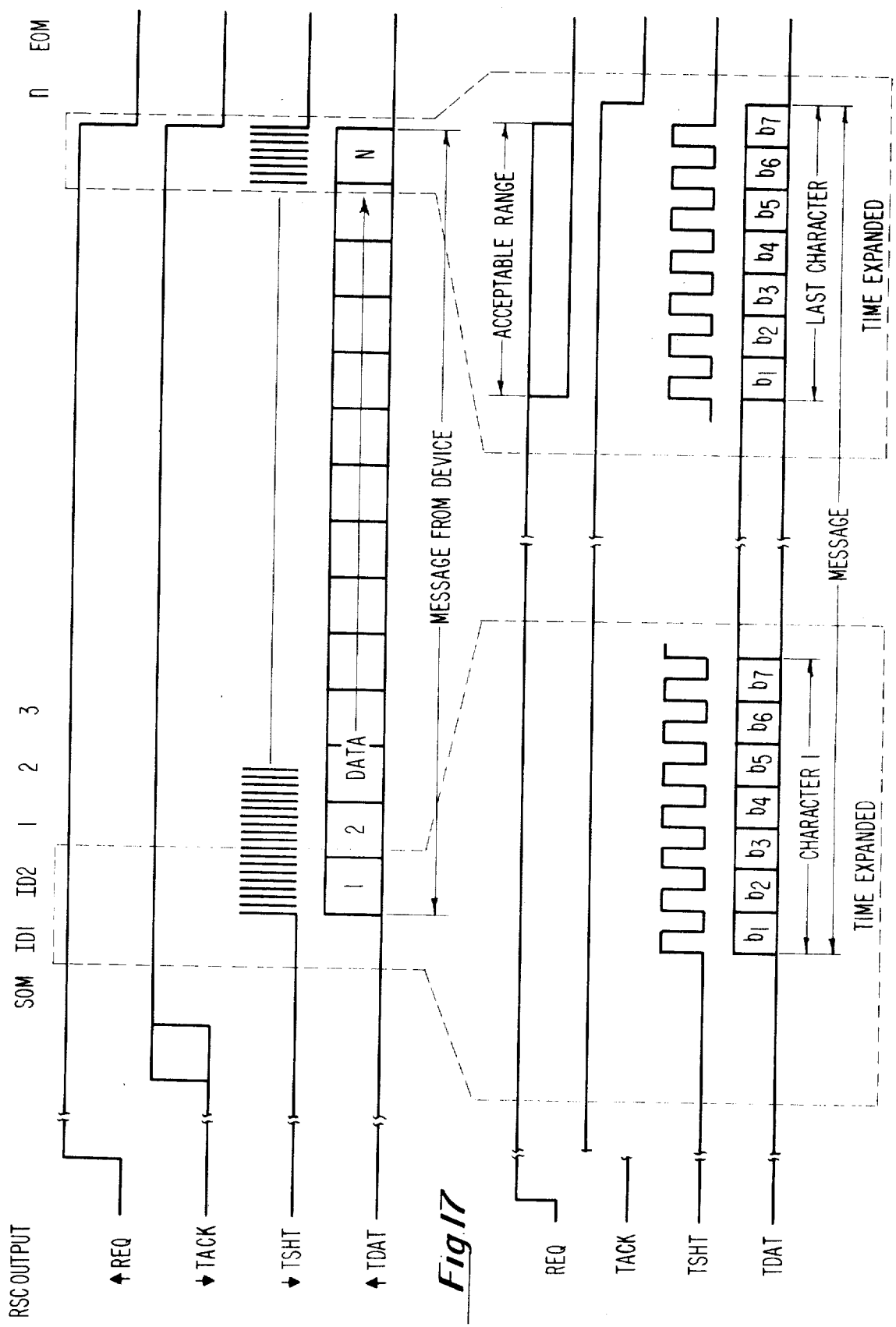
FIG. 17 shows timing details of a message going from a device or agent set, to the data processor via the remote scanner and control unit.

Four lines are used for transferring data from an agent set 74 to an RSC 70 transmit unit 86. The transmit shift line TS (FIG. 3) is a common line from an RSC 70 to all agent sets 74 serviced by it. The other three lines (RQ, TA, and TD) are individual lines running from the RSC 70 to each of its agent sets 74. Timing details for transmissions from an agent set 74 are shown in FIG. 17.

When messages are to be sent from an agent set 74, its request line RQ (FIG. 3) is first raised by the agent set when it is ready to transmit, and remains raised until either:

(1) The RSC has serviced the agent set and accepted the last character, or
(2) The agent set withdraws its request for service, usually because an alternate RSC has grainted it service.

After the request line RQ of the particular agent set 74 is raised and the RSC 70 is ready to grant it service, the RSC raises the transmit acknowledge line TA. Pulses are sent from the RSC 70 to the agent set 74 over the transmit shift line TS when the RSC is ready to accept each data bit. These pulses are synchronous with the serial clock transmit pulses SCT from the data set 78.

A message from an agent set 74 that is sent out on its transmit data line TD passes through the RSC transmit unit 86 to its send data line SD, and continues to the computer 72 over the inbound phone lines 76a of channel 76 (FIG. 1).

The operation of the RSC 70 is basically one of receiving and transmitting format messages. Primary control of the communications system is given to the master or central transmitting device at the computer site 72. The computer-to-RSC transmission is continuous and consists of either computer-generated messages addressed to agent sets 74, or continuous, synchronous idle characters SYN when no messages are ready. In addition, two-character poll messages may be inserted into the character stream at any time, to authorize an RSC 70 to start transmitting to the computer 72.

Serial transmission is employed for both input and output data at both the RSC-data set 78 interface and the RSC-agent set interface. Characters are composed of contiguous 7-bit units each consisting of a 6-bit character plus a parity bit. Each character is transmitted least significant bit ($b_1$) first, through the most significant bit ($b_6$), followed by a parity bit ($b_7$), which makes the number of ONES in the 7-bit unit odd. Although use of a 6-bit character, in the illustrative binary code system, could allow 64 different characters to be transmitted to an agent set 74, certain binary combinations have been reserved for use as control codes, most of which are not transmitted to the agent sets. Since both control characters and message characters are transmitted between the computer 72 and RSC 70 over the same data lines, the RSC 70 constantly senses each character code to determine if it is a control code. The RSC 70 also generates control characters for interpretation by the computer 72.

The control character codes pertinent to RSC operation are shown in the tabulation in FIG. 19 and defined as follows:

| Mnemonic: | Definition |
|---|---|
| FID | Agent set field identifier code. |
| SOM | Start-of-message character. |
| EOM | End-of-message character. |
| POL | First character in a poll message. |
| EOT | End-of-transmission character. |
| SYN | Synchronous idle character. |
| DEL | Delete code. |
| PEI | Parity error character. |

The FID (field identifier) character code is the only control code that is sent from an agent set 74 to the computer 72 or vice versa, and yet is sensed by the RSC 70 to initiate a control function. The other control codes are not sent to or from the agent sets 74, and may or may not be interpreted in different ways by the RSC 70 and the computer 72. For example, binary 101111 is a control code used in two different ways:

(1) The computer 72 uses 101111 to notify the RSC 70 of a poll message.
(2) The RSC 70 uses 101111 to indicate end of transmission.

The ID1 and ID2 address characters identify, respectively, a particular RSC 70 and a particular agent set 74 involved in a transmission. However, the agent sets 74 never send or receive an address character. In transmissions to the computer 72, the RSC 70 supplies the ID1 and ID2 address characters in front of the message from an agent set 74. In transmissions from the computer 72, the ID1 and ID2 address characters are supplied to the RSC 70 by the computer 72 via the date sets 80 and 78, but are stripped by the RSC from the message sent to the agent set 74.

The ID1 and ID2 code formats are shown below:

| Bit | LSB 1 | 2 | 3 | 4 | 5 | MSB 6 | 7 |
|---|---|---|---|---|---|---|---|
| ID1 | {Agent set {Address $2^5$ | $2^0$ | RSC address $2^1$ $2^2$ | | $2^3$ | 0 | Parity |
| ID2 | {Agent set address {$2^0$ | $2^1$ | $2^2$ | $2^3$ | $2^4$ | 0 | Parity |

In one mode of operation which is merely illustrative and not to be considered as limiting the invention, transmission of the address codes have been confined to five bits per character (lower 32 character codes). This mode of operation was chosen for the particular embodiment to resolve the possible ambiguity of address assignment coinciding with communication control codes. To achieve this solution, the most significant or sixth bit (MSB) of the agent set address code ID2 is transmitted and received in the last significant bit position (LSB) of the RSC address character ID1, as indicated above in the ID1 and ID2 code formats.

Agent set address 0 applies to the test buffer 90 built into the RSC 70. The addresses 1 through 63 apply to the illustrative 63 agent sets that may be connected to an RSC 70. Because of the modular nature of the RSC-agent set interface, the agent sets are assigned to sequential addresses starting with address 1.

Each RSC 70 on a phone line is assigned a different address. Since in the exemplary communications system shown in FIG. 1 there are 15 RSC's 70 on each full duplex line 76, the RSC's 70 on each such line 76 are assigned addresses in the range 1 through 15. RSC address 0 is recognized by all RSC's 70 except in poll messages, and serves the function of an all-points or broadcast address. For polling messages (which address only a particular RSC 70 and which contain only the POL control character and the ID1 address character) bit 1 of the ID1 character is always ZERO.

The computer-to-RSC transmission is a continuous stream of characters containing reply messages, poll messages, and synchronous idle characters SYN. Reply messages are transmitted successively except when there are no messages ready. Their format is:

SOM—Start-of-message character
ID1—RSC address character
ID2—Agent set address character
Data—Message data for agent set
EOM—End-of-message character Poll messages can be inserted into the data stream at any time; they may or may not be preceded by SYN characters. The poll message format is:

POL—Start-of-poll character
ID1—RSC address character

One or more SYN characters may be transmitted between messages to allow the RSC 70 to idle synchronously. In the illustrated embodiment, seven SYN characters have been chosen to cause the receive unit 84 to resynchronize its character timing. When a message is not ready, the SYN characters are generally transmitted continuously.

In response to a poll message from the computer 72, the RSC 70 transmits to the computer a message from each agent set 74 that is found ready to transmit. The transmission format is:

Carrier on
SYN _____ Synchronous idle character.
SYN _____ Synchronous idle character.
SYN _____ Synchronous idle character.
Message 1:
   SOM _____ Start-of-message character.
   ID1 _____ RSC address character.
   ID2 _____ Agent set address character.
   Data _____ Message data from agent set.
   EOM _____ End-of-message character.
Message 2
Message N
EOT _____ End-of-transmission character.
Carrier off Any number of messages may be transmitted to the computer 72. If no messages are ready, SYN, SYN, SYN, EOT is transmitted by the RSC 70 as an acknowledgement of the poll. This allows polling of other RSC's 70 by the computer 72 to continue.

The receive unit 84 and the transmit unit 86 of the RSC operate independently except for the notification (FIG. 2) by the receive unit 84 to the transmit unit 86 of the reception of a poll message.

The receive unit 84 processes active data from the computer 72 by utilizing six modes of operation:

Mode 0 _____ Idle
Mode 1 _____ SOM
Mode 2 _____ ID1
Mode 3 _____ ID2
Mode 4 _____ Message
Mode 5 _____ Poll These modes of operation are also tabulated in FIG. 18 in which is also indicated the response of the receive unit 84 to the detection of the various character codes, both normal and abnormal. For example, the detection of a poll character at any time causes a transfer to mode 5 and a return to the original mode. Character synchronization is established and maintained by continuously searching for seven consecutive SYN characters starting in any bit position. Out-of-phase detection of seven SYN's causes resynchronization.

Upon the receipt of a poll message from the computer 72, the receive unit 84 activates the transmit unit 86. The transmit unit 86 then scans the request lines RQ of all of its associated agent sets 74 and if it finds any agent set that is ready to transmit (has its RQ line raised) it sends to the data set 78 the following message format for each such agent set:

SOM—Start-of-message character
ID1—RSC identification
ID2—Agent set identification
The message (until the RQ line is lowered)
EOM—End-of-message character If the request line RQ from any agent set 74 remains raised for more than a predetermined time, the RSC 70 terminates the message and resumes scanning the request lines RQ of the remaining agent sets 74. If the RSC 70 detects a parity error in a character from an agent set 74, it substitutes in its place a parity error character PE1.

After all agent set requests for service have been handled, the RSC 70 sends an end-of-transmission character EOT to the data set 78 and lowers its request-to-send line RTS to instruct the data set 78 to turn off its carrier signal.

Detailed description

Figure 5:
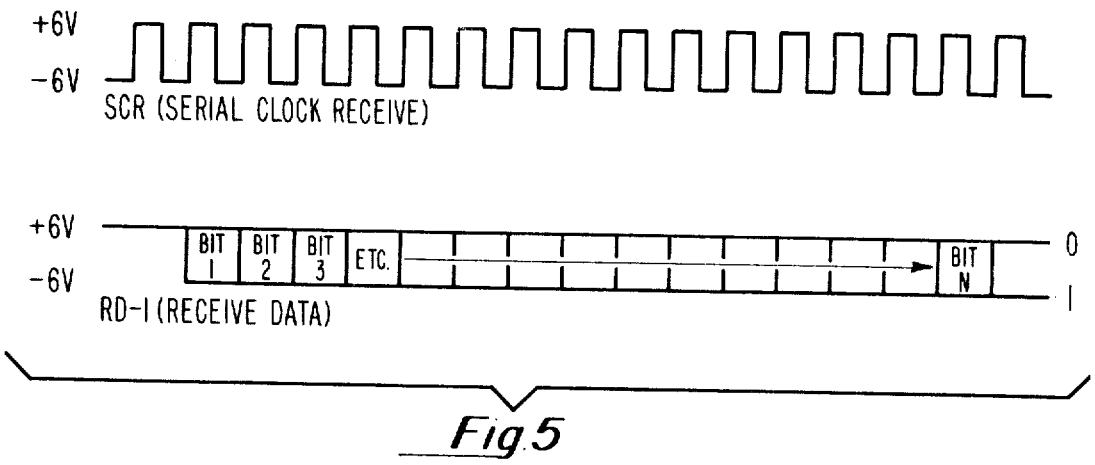
FIGS. 5 and 6 are timing diagrams of singals used at the interface between the remote scanner and control unit and a data set. The signals in FIG. 5 are involved in receive operations in which the remote scanner and control unit receives data from the data processor, while the signals in FIG. 6 are involved in transmitting operations in which the remote scanner and control unit transmits data to the data processor.
Figure 6:
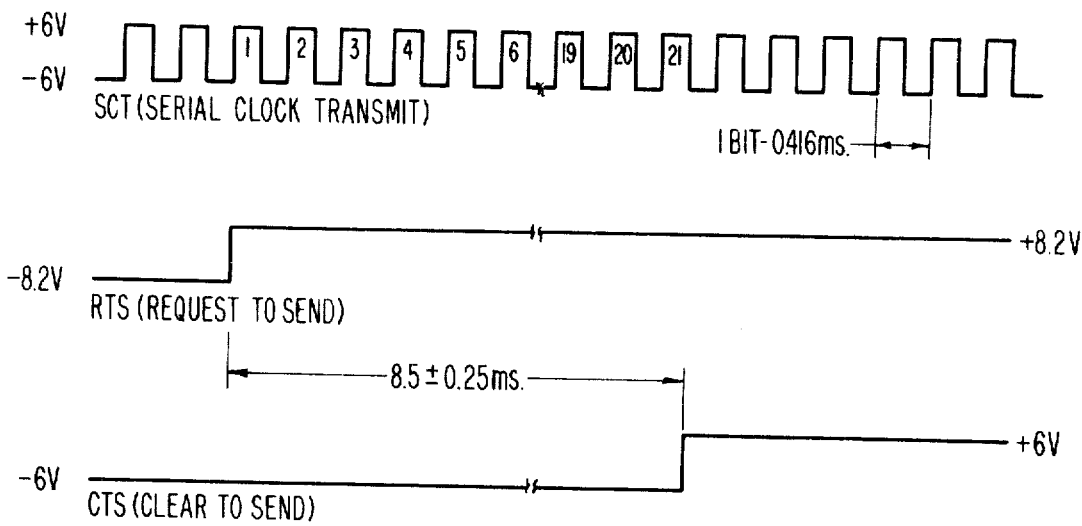

Interfacing signals between the RSC 70 and the data set 78 are in accordance with EIA Standard RS 232B which is a standard of the Electronic Industries Association, 2001 Eye St., NW., Washington, D.C. A full technical description is given in the Bell System Technical Reference covering the 201A and B interface specifications dated September 1962. The RSC 70 is concerned with the data set 78 interface signals whose lines are shown at 97 in FIG. 3. The wave forms of these signals are shown in FIGS. 5 and 6. It is understood that the interfacing signals in accordance with the EIA Standard are illustrative only and are not to be considered as limiting the invention, since the invention may be used with other signal requirements in different communications systems.

The data set 78 uses nominal signal levels of +6 and −6 volts. A negative signal represents a mark, ONE or off; a positive signal represents a space, ZERO, or on. A communications data set interface block 98 (FIGS. 2 and 4A) contains interface circuits that provide the level and impedance matching capabilities required to match the bipolar signals of the data set 78 interface. Receiver circuits in the block 98 normalize the data set 78 signals to +3.6 volts, or ground, and invert the level sense. Driver circuits in the interface block 98 provide a bipolar output level in transmissions to the data set 78; however, there is no level sense inversion. A nominal output voltage of the driver circuit in the interface block 98 is ±8.2 volts.

In the transmit circuits (FIG. 6 signals), the clear-to-send line CTS is raised on a negative-going edge of the serial clock transmit SCT. The first data bit is sent starting with the next positive-going edge of the serial clock transmit SCT. Specifically, the data changes on the positive-going edge of the serial clock transmit SCT, and the data set 78 samples the data on the negative-going edge of the serial clock transmit SCT.

Figure 7:
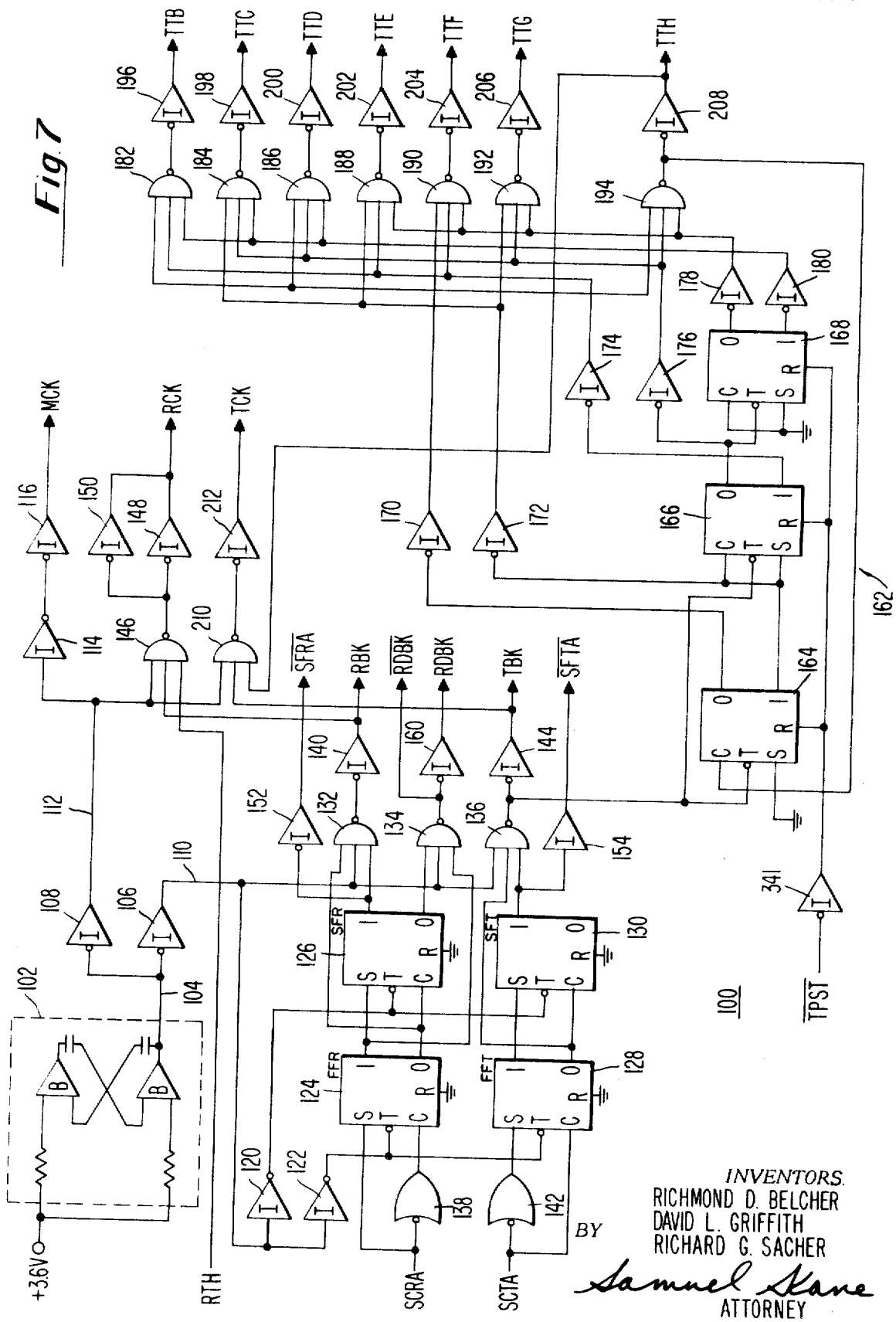
FIG. 7 is a logic diagram of a master oscillator and clock generator and transmit bit counter shown in FIG. 4A.

The serial clock receive SCR (FIG. 5) and the serial clock transmit SCT (FIG. 6) signals are transmitted by the data set 78 to the communications data set interface 98 (FIG. 4A) and the resulting signals SCRA and SCTA applied to the circuitry in a block 100 which includes a master oscillator and clock generating circuit, and a transmit bit counter together with its associated circuitry. The master oscillator and clock generating circuit in block 100 includes a master oscillator 102 (FIG. 7) which is a medium frequency clock generator producing nearly symmetrical pulses at a repetition frequency of 100 kilohertz. The output 104 of the master oscillator 102 is applied to two inverter circuits 106 and 108 to obtain master clock signals MCK at the outputs 110 and 112 of the inverters 106 and 108. The master clock at 112 is applied to two inverter circuits 114 and 116 to obtain a master clock MCK which is transmitted to a scanner and decoder 118 (FIG. 4B), as will appear more clearly hereinafter.

Figure 8:
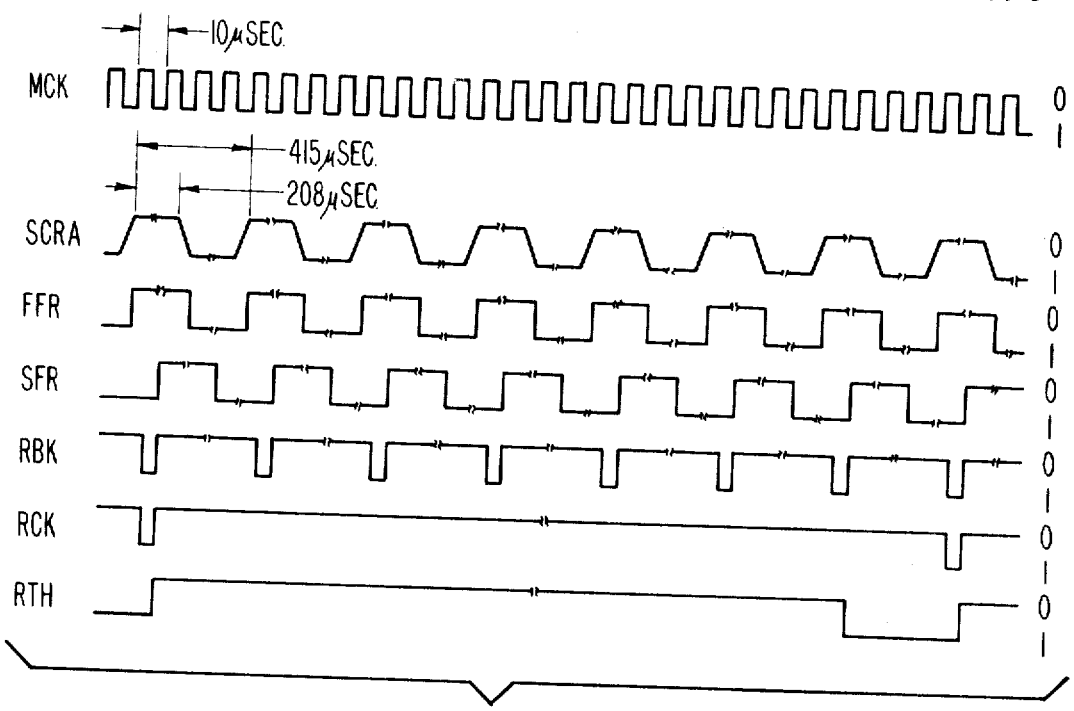
FIG. 8 is a master timing chart illustrating the receive clocks and other signals which are generated by the circuitry in FIGS. 7 and 10.
Figure 9:
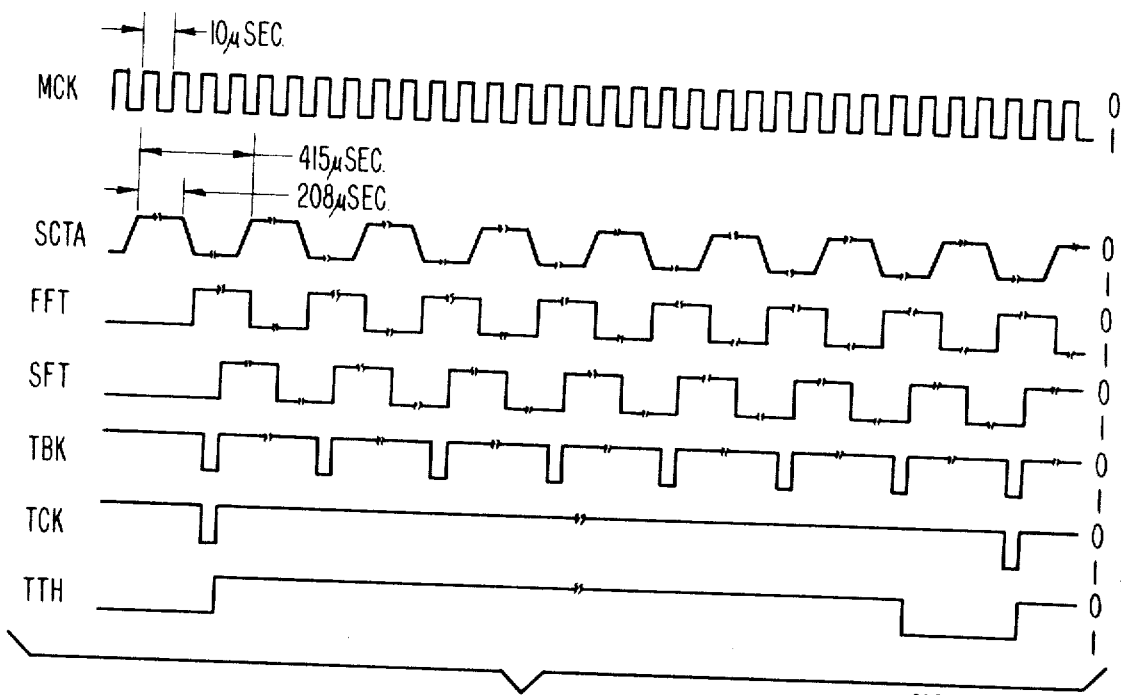
FIG. 9 is a master timing chart illustrating the transmit clocks and other signals which are generated by the circuitry in FIG. 7.

The synchronous bit clock signals SCRA and SCTA obtained from the data set interface 98 are time quantized with respect to the master clock and are used to produce a transmit bit clock TBK and a receive bit clock RBK, as well as other signals (FIGS. 8 and 9), as will appear presently, which are used within the remote scanner and control unit 70. The master clock MCK at 110 (FIG. 7) is applied to the logic circuitry comprising inverters 120 and 122, complementary flip-flops 124, 126, 128 and 130, known in the art by the designation "J–K," and three AND gates 132, 134 and 136.

The serial clock receive signal SCRA (FIGS. 4A and 7) is applied to the logic circuitry comprising an inverter 138, the flip-flops 124 and 126, the AND gate 132 and an inverter 140 to obtain the receive bit clock RBK. The serial clock transmit signal SCTA is applied to the logic circuitry comprising an inverter 142, the flip-flops 128 and 130, the AND gate 136 and an inverter 144 to obtain the transmit bit clock TBK.

The master clock MCK at 112, the receive bit clock RBK and an RTH signal (see also FIG. 10) which will be described shortly hereafter, are applied to an AND gate 146 whose output is connected to a high fan-out gate comprising two inverters 148 and 150, to obtain a receive character clock RCK.

The master oscillator and clock generating circuitry also develops a shift receive signal $\overline{SFRA}$ as the output of an inverter 152 whose input is connected to the ONE side output, designated SFR, of the flip-flop 126. A shift transmit signal $\overline{SFTA}$ is similarly developed as the output of an inverter 154 whose input is connected to the ONE side output, designated SFT, of the flip-flop 130. As will appear later on, the shift receive signal $\overline{SFRA}$ is used in the logic circuitry of a receive control and sequencer block 156 (FIG. 4), and the shift transmit signal $\overline{SFTA}$ is used in the logic circuitry of a transmit control and sequencer block 158 (FIG. 4).

It may be noted at this time that in order to simplify the drawings in FIGS. 4A and 4B, the bar or overlining across the mnemonic symbols such as the bar across $\overline{SFRA}$ (FIG. 7), for example, indicating the inverse logic level, has been omitted from those drawings.

The output of the AND gate 134 (FIG. 7) provides an inverse receive bit clock delayed signal $\overline{RDBK}$ and is also applied to an inverter circuit 160 to obtain a receive bit clock delayed signal RDBK.

The transmit bit counter 162 (FIG. 7) of the block 100 defines and controls transmission from the remote scanner and control unit 70 to the data set 78. The transmit bit counter 162 is a three-stage counter comprising three J–K flip-flops 164, 166 and 168, and is incremented by the output of gate 136. The transmit bit counter 162 requires seven increments or steps before the same state is again reached. Each state of the counter 162 is decoded in a decoding network which comprises inverters 170, 172, 174, 176, 178 and 180, AND gates 182, 184, 186, 188, 190, 192 and 194, and inverters 196, 198, 200, 202, 204, 206 and 208. All seven of the decoded states of the transmit bit counter 162, in the form of transmit bit time signals TTB to TTH, are applied to the transmit encoder 94 (FIG. 4A) in which they are used to provide basic timing units. One decoded state, the TTH signal (FIG. 7), is gated with the transmit bit clock TBK and the master clock MCK at 112 by an AND gate 210 whose output is applied to an inverter 212 to obtain the transmit character clock TCK. This signal is used in the transmit control and sequence logic in the block 158 (FIG. 4).

Computer-transmitted data from the data set 78 is transmitted bit-serially over the receive data line RD-1 (FIG. 4A) to the communications data set interface circuits 98, processed by a receiver circuit therein, and the resulting signal data transmitted bit-serially over the receive data line RDA to the receive character buffer in block 92. The receive character buffer consists of a seven-bit storage register. An additional storage unit is used for buffering the data bit presented to the agent set interface circuits 214 (FIG. 4B) of which there are eight in the present embodiment of the invention, identified by the reference characters 214–1 to 214–8 inclusive. In order to simplify the drawings, however, only three of the eight agent set interface circuits are shown in FIG. 4B. These are identified respectively as 214–1, 214–2 and 214–8.

Information is shifted into the receive character buffer in block 92 (FIG. 4A) over the RDA line by, and in synchronism with, the receive bit clock RBK. The state of the input storage unit of this buffer is also used in performing an odd parity check on incoming data, as will be described more fully later on.

The receive character buffer or register in block 92 accumulates the bits into a seven-bit character such that the control and detection logic can be implemented by using the outputs from each stage to detect various control and address characters. The characters are decoded by a decoder circuit also represented by block 92. The decodes of the control characters are sent from the decoder over the following lines, which are defined as follows to indicate the particular control character which is being decoded:

DSYN—decode SYN character
DSOM—decode start-of-message character
DRID—decode receive address
DEOM—decode end-of-message character
DFID—decode field identifier
DDEL—decode delete character
DSOP—decode start-of-poll character
DPID—decode poll address If a synchronous idle character SYN is received in the receive character buffer of block 92 its decode will activate the sync control mode. The synchronization used with the present invention may be based on the reception of a sequence of synchronous idle characters SYN of any desired number. In the illustrated embodiment of the invention, synchronization has been chosen to be based on the reception of a seven-SYN character sequence. The RSC 70 is capable of recognizing this sequence at any time. The invention is also capable of permitting the synchronization process to proceed during regular message modes of the receive control logic.

Figure 10:
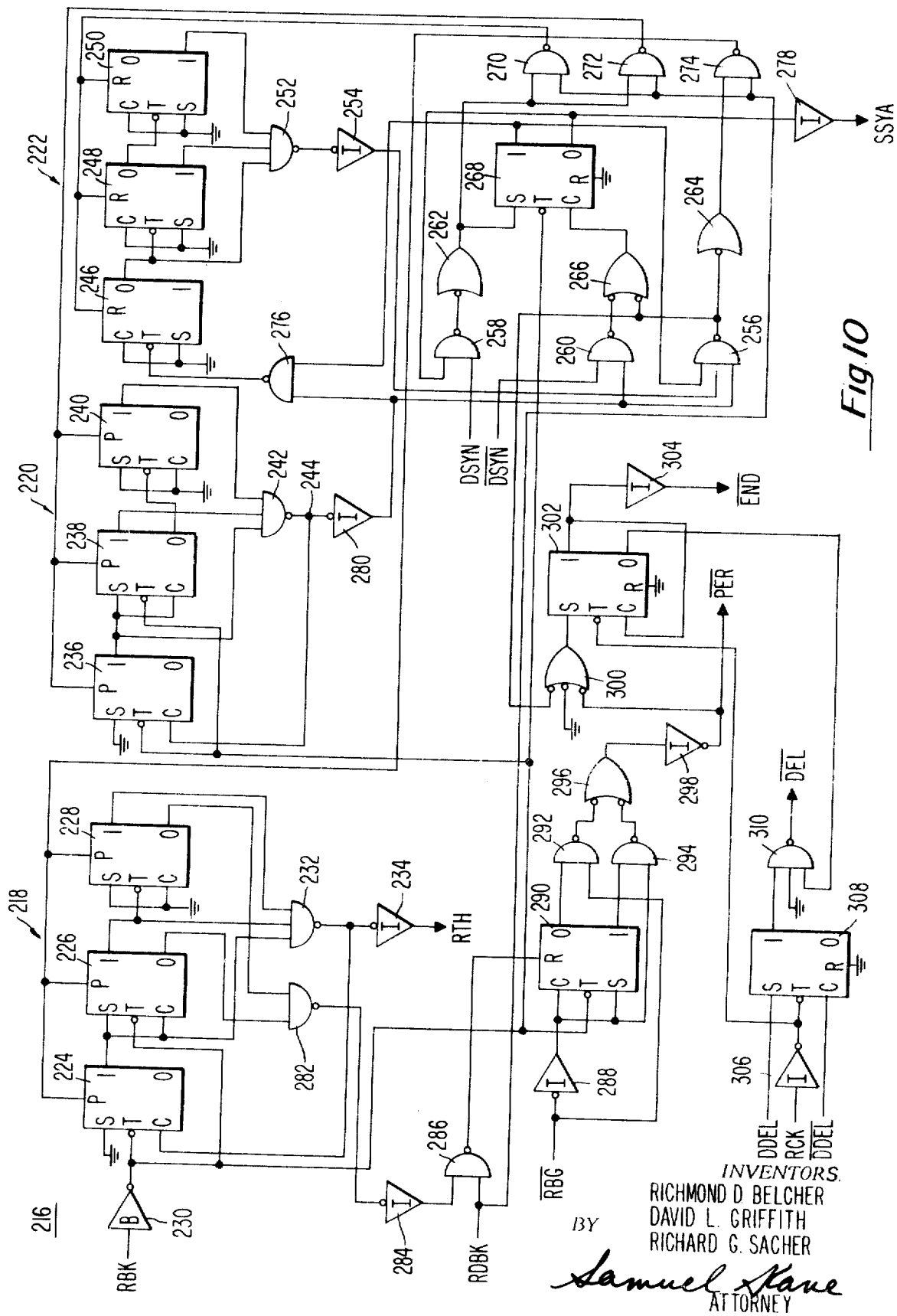
FIG. 10 is a logic diagram of a character timing and synchronizing unit shown in FIG. 4A.

Receive character timing and synchronization is performed by the circuitry in a character timing and synchronizing block 216 (FIG. 4A) whose logic diagram is illustrated in FIG. 10. The timing and synchronization circuitry in FIG. 10 comprises a basic receive bit counter 218, a sync bit counter 220 and a sync character counter 222.

The basic receive bit counter 218 is a three-stage counter comprising J–K flip-flops 224, 226 and 228. The counter 218 is incremented by the receive bit clock RBK through a buffer 230 and is arranged so that it will count to seven, and then repeat. Each time the counter 218 attains a count of seven, it will produce, through an AND gate 232 and an inverter 234, the receive last bit count signal RTH.

The sync bit counter 220 is also a three-stage counter comprising J–K flip-flops 236, 238 and 240. The counter 220 is similarly incremented by the receive bit clock RBK through the buffer 230 and, upon attaining a count of seven, will produce, through an AND gate 242, a signal at 244 and return to its starting condition for counting the next seven-count sequence.

The sync character counter 222 is also a three-stage counter comprising J–K flip-flops 246, 248 and 250, and is arranged to attain a count of six, at which time, through an AND gate 252 and an inverter 254, it will apply an input signal to an AND gate 256.

Receipt of a seven-bit SYN character in the receive character buffer of circuit 92 (FIG. 4A) activates the sync control mode as follows: The SYN character in the receive character buffer of circuit 92 is decoded by the decoder in circuit 92 and the resulting signal decode DSYN together with its inverse logic level signal $\overline{\text{DSYN}}$ are applied individually as inputs to AND gates 258 and 260, respectively (FIG. 10), of the logic circuitry which also includes the AND gate 256, inverters 262 and 264, an OR gate 266, a J–K flip-flop 268 and AND gates 270, 272, 274 and 276. An inverter 278 connected to the ZERO side of the flip-flop 268 may also be provided, if desired, to obtain a start-synchronizing-sequence signal SSYA in order to provide a sensible indication to the operator of the particular RSC 70, such as by lighting a lamp, not shown, to indicate that the synchronization mode is in process.

Upon activation of the sync control mode as described above, the sync bit counter 220 and the sync character counter 222 are subjected to forced reset by output signals from the AND gates 272 and 270, respectively. Each time the sync bit counter 220 advances to the seventh count, the receive character buffer in circuit 92 (FIG. 4A) is examined by the decoder in that circuit to determine whether it contains another SYN character. If another SYN character is present in the receive character buffer, the sync character counter 222 (FIG. 10) will be incremented by a signal at 244 from the sync bit counter 220 through an inverter 280 applied to one input of the AND gate 276 and by a signal from the ONE side output of the flip-flop 268 applied to the other input of the AND gate 276, and the procedure repeated each character time. When the sync character counter 222 reaches a value of six, it will apply an input signal to AND gate 256, through the AND gate 252 and inverter 254, so that at the next character time when a signal appears at 244 an output signal from the AND gate 274 will force the basic receive bit counter 218 into a synchronous status. If at any time during the synchronization sequence a non-SYN character is detected, the synchronization mode is terminated.

If for some unforseen reason synchronization occurs while in the receive message mode, the data transfer to the particular agent set 74 is terminated with an incorrect parity character by the receive control and sequencer 156 (FIG. 4) upon receiving an end receive message signal $\overline{\text{END}}$ (FIG. 10), and the control returns to the IDLE mode.

Even-character parity is detected within the receive logic and causes the end sequence previously described, namely, termination of data transfer to the agent set with an incorrect parity character by the receive control and sequencer 156 upon receiving a parity error signal $\overline{\text{PER}}$ and an end receive message signal $\overline{\text{END}}$. Odd parity transmission has been arbitrarily chosen for use with the illustrated embodiment of the invention and, as stated previously, the state of the input storage unit of the receive character buffer in circuit 92 (FIG. 4A) is also used in performing an odd parity check on incoming data. If the seven bits of the receive character buffer in circuit 92 are identified consecutively, least significant bit first, from RBA to RBG, then the receive bit of the input storage unit is RBG. Accordingly, the state of this bit in the form of an $\overline{\text{RBG}}$ signal is applied to an inverter 288 (FIG. 10) and an AND gate 292 of the parity checking logic. The parity checking logic comprises an AND gate 282, connected to the ZERO sides of the flip-flops 226 and 228, an inverter 284, and AND gate 286, the inverter 288, a J–K flip-flop 290, AND gates 292 and 294, an OR gate 296, an inverter 298, an OR gate 300, a J–K flip-flop 302 and inverters 304 and 306.

As indicated previously, the computer-to-RSC transmission is continuous and consists of either computer-generated messages addressed to agent sets 74, or of continuous SYN characters when no messages are ready. It was also mentioned previously that, in addition, two-character poll messages may be inserted into the character stream at any time, to authorize a particular RSC 70 to start transmitting to the computer 72.

At certain times when none of the previously-described messages are being transmitted, the computer 72 may transmit a delete data character DEL (FIG. 19). This character is a time-fill character which, as its definition implies, is used merely for the purpose of taking up time. However, since it is not desired to transmit the delete character DEL nor the synchronous idle characters SYN to the agent sets 74, these characters are removed from the data stream whenever they are detected in the receive character buffer in the circuit 92 (FIG. 4A). This is accomplished by decoding the delete character DEL, and also the synchronous idle character SYN, whenever they appear in the receive character buffer 92, and by applying the resulting decode DDEL and its inverse logic level $\overline{DDEL}$ to input terminals of a J–K flip-flop 308 (FIG. 10) whose ONE side output is connected to an input terminal of an AND gate 310, another of whose input terminals is connected to the ZERO side output of the flip-flop 302, and further, by applying the receive character clock RCK to an input terminal of the inverter 306. Thus the output signal $\overline{DEL}$ of the AND gate 310 is transmitted to the receive control and sequencer 156 (FIG. 4) which causes the delete character DEL and synchronous idle character SYN to be deleted from the data stream presented to the particular agent set 74.

Messages from the data processor 72 to a particular agent set 74 commence with the transmission of a start-of-message character SOM into the receive character buffer in circuit 92 (FIG. 4A). The start-of-message character SOM is decoded by the decoder in circuit 92 and the decode DSOM transferred to the receive control and sequencer 156, within which is located the central control of the receive unit 84. The basic action of the receive control and sequencer 156 is to examine the contents of the receive character buffer in circuit 92 via the decoder unit in that circuit, and to take subsequent action based on the character sequences which are received from the computer 72. The major modes (FIG. 18) within the control logic in the sequencer 156 are IDLE, SOM, ID1, ID2, and MESSAGE (data) and are sequential in nature except for the IDLE mode. The sequence of events in the receive unit 84, and to some extent in the transmit unit 86, are programmed by the logic in the receive control and sequencer 156.

Upon detection of the start-of-message character SOM, as described above, the RSC 70 goes to mode 1, which is the SOM mode, so that it can sense the RSC 70 address character which follows as the ID1 character. A message not addressed to a particular RSC 70 causes it to go back to the idle mode.

Figure 11:
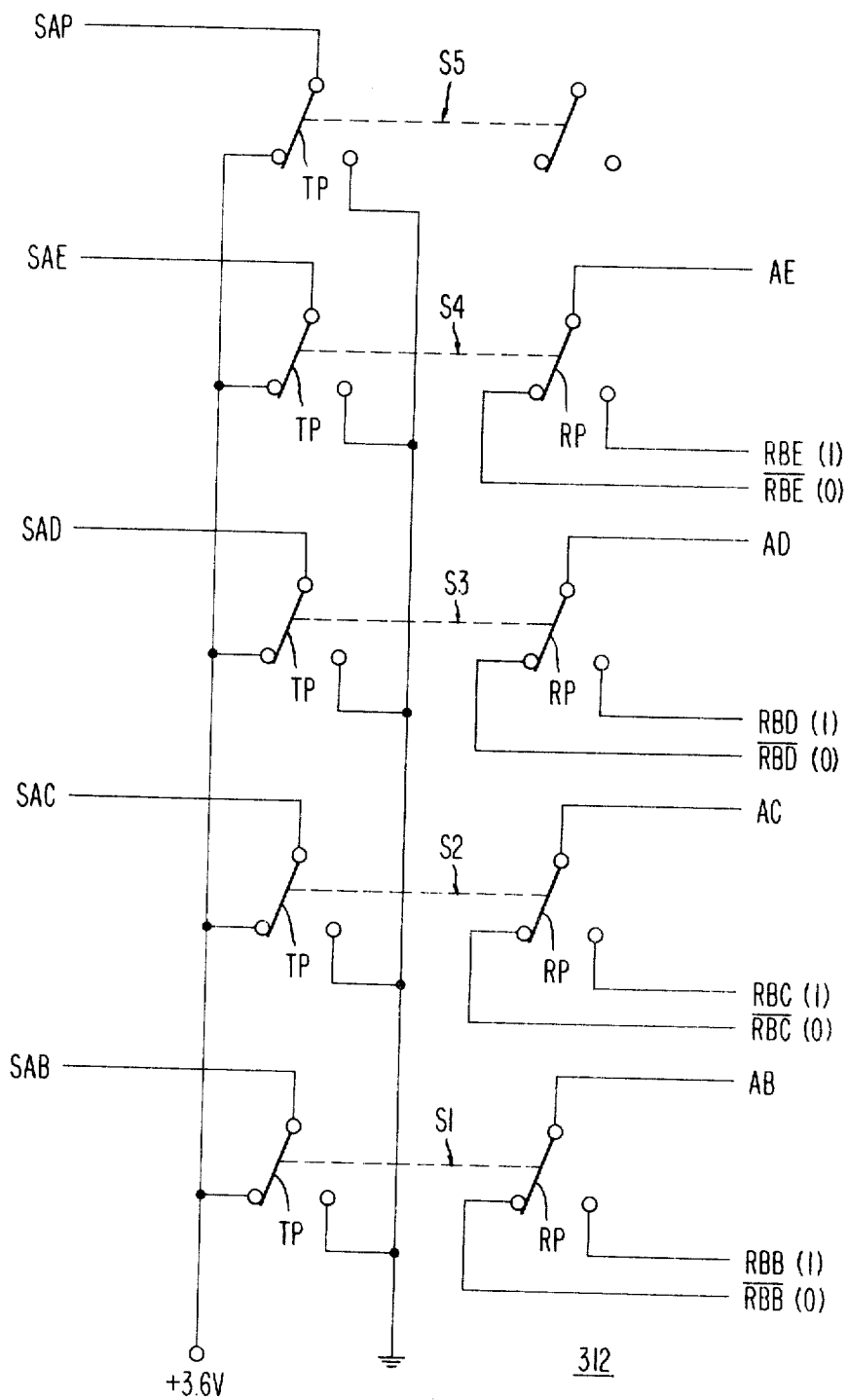
FIG. 11 is a schematic diagram of address selection switches shown in FIG. 4A.
Figures 12, 13:
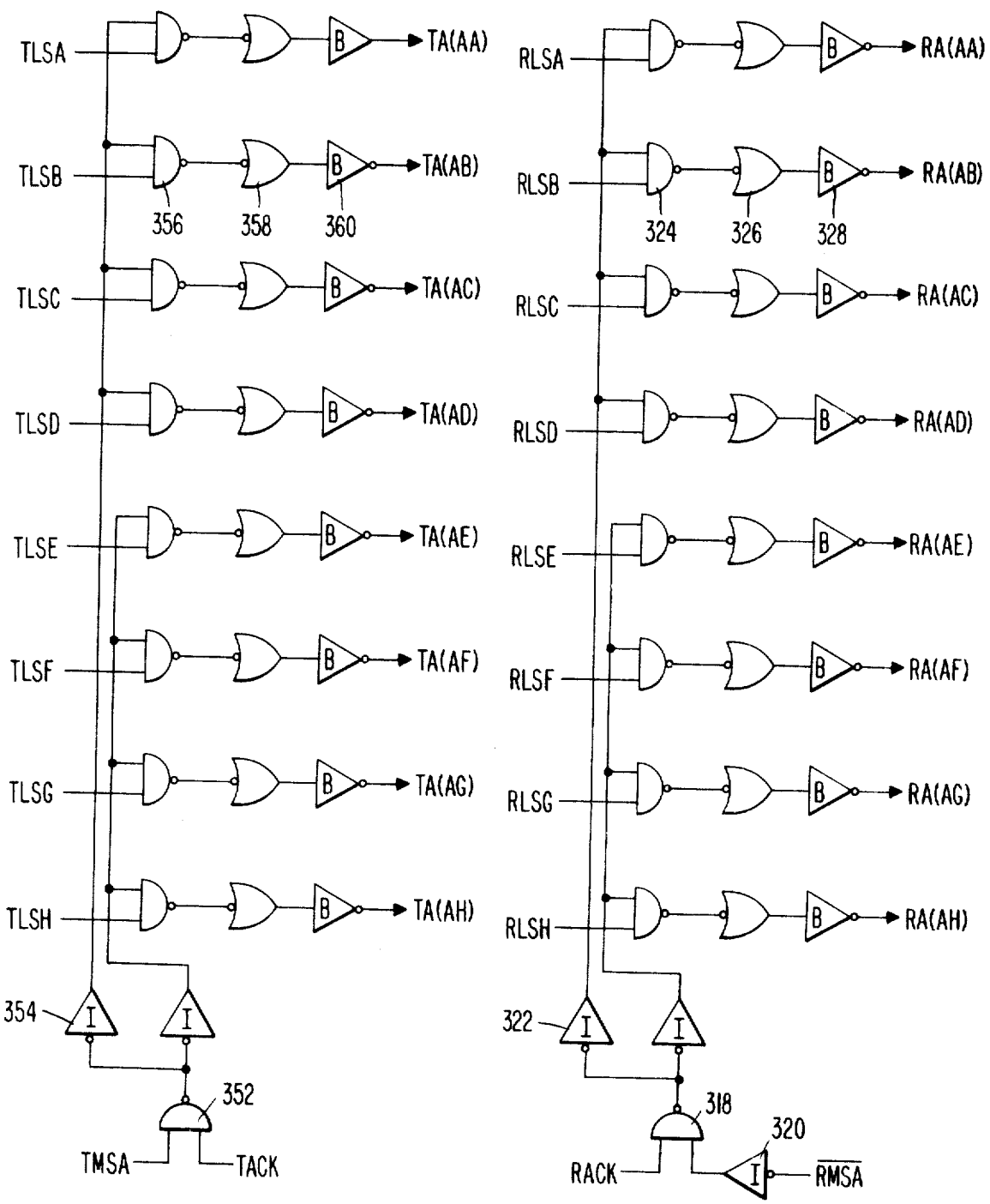
FIGS. 12 and 13 illustrate gate and driver circuits of one of the agent set interface groups shown in FIG. 4B.
Figure 14:
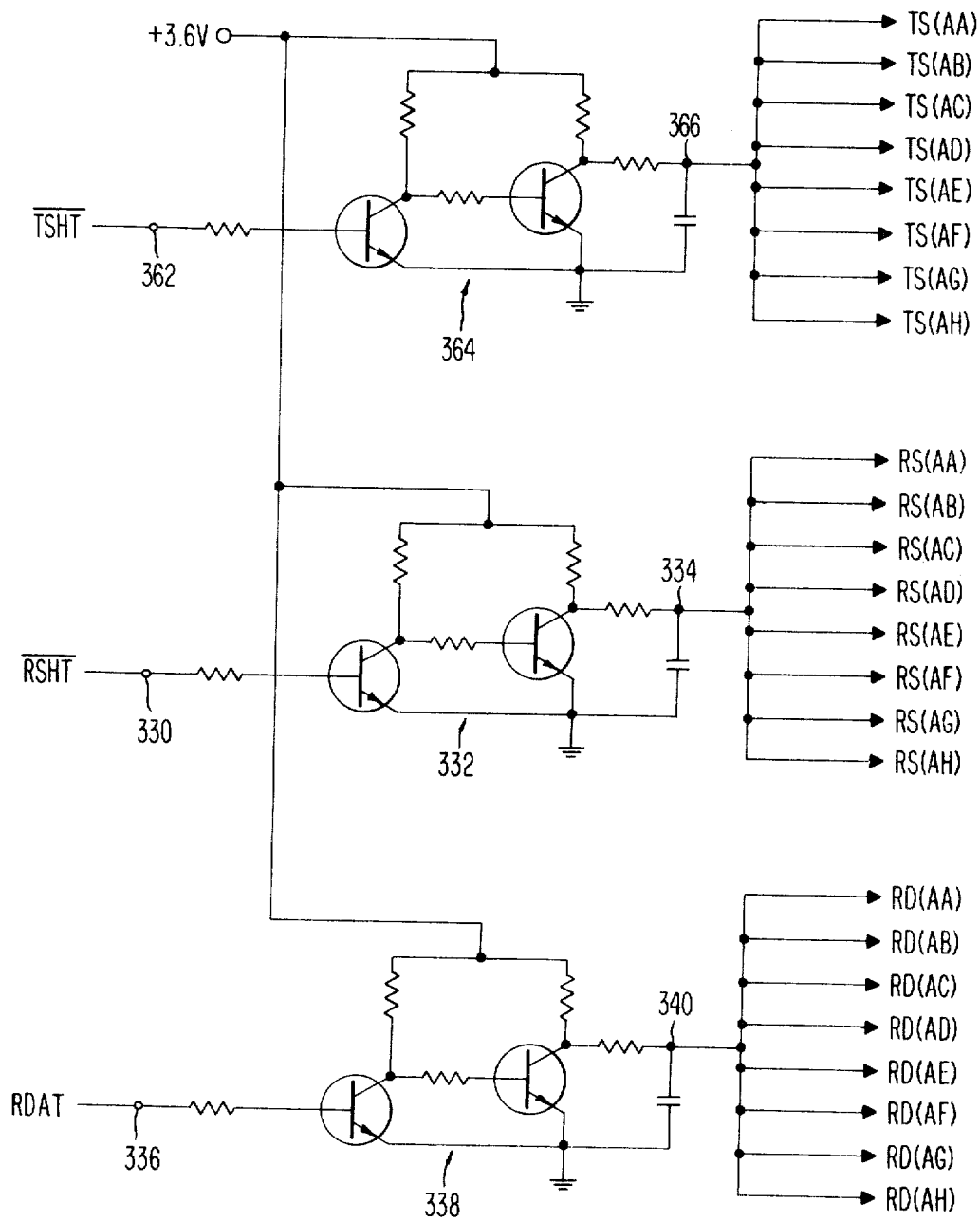
FIG. 14 is a schematic diagram of driver circuits for the same one of the agent set interface groups shown in FIG. 4B.

The address of the several RSC's 70 can be field-adjusted to any one of a number of values, depending upon the selected number of RSC's in the particular communication system. Thus in the present illustrative communication system, each of the 15 remote scanner and control units 70 on a channel 76 (FIG. 1) can be field-adjusted by switches in block 312 (FIG. 4A) to any of 15 values. This allows each of the illustrative 15 RSC's 70 to be assigned a unique address. For field-adjusting each RSC 70 to a particular address for receiving operations, which in the present embodiment of the invention is a binary coded address, the switches in block 312 include four double-pole-double-throw address selection switches S1–S4 (FIG. 11). A fifth double-pole-double-throw switch S5 (one pole idle) is used in conjunction with the other four switches for transmitting the RSC 70 address to the computer 72, as will appear more fully hereinafter.

The four address selection switches S1–S4 are connected to the receive character buffer and decoder 92. In the present embodiment of the invention, each stage of the receive character buffer in circuit 92 comprises a J–K flip-flop, not shown, each of which may be further identified as corresponding to one of the seven receive bits RBA–RBG. Thus, the four bits RBB–RBE, or four flip-flops of the receive character buffer in circuit 92, corresponding to bit positions $b_2$–$b_5$, have both their ZERO side output and their ONE side output connected individually to eight lines designated collectively as RBB–E in FIG. 4A which lead to the four address selection switches S1–S4. In FIG. 11 the eight lines are shown individually and are designated RBB to RBE (ONE side) and $\overline{RBB}$ to $\overline{RBE}$ (ZERO side). Thus, by switching the four address selection switches S1–S4 to either the ONE side or the ZERO side of its associated flip-flops in the receive character buffer in circuit 92, the address of the particular RSC 70 can be field-adjusted in binary code to any one of 16 values ($2^4$), thus providing adequate address values for the 15 RSC's 70 in the illustrative communications system.

Accordingly, each of the four address selection switches S1–S4 has its receive pole RP connected to one of four lines AB–AE which lead to the decoder in circuit 92 so that the resulting decode of the RSC 70 address character will be transmitted over the DRID line to the receive control and sequencer 156, which then goes into the ID1 mode so that it can sense the agent set address character which follows as the ID2 character. The receive control and sequencer 156 generates a signal on an SIDA line (FIG. 4B) to an agent set address register in a block 314. This signal, together with the receiver character clock RCK (FIG. 4A) serve to transfer the least significant bit of the RSC address character from the receive character buffer in circuit 92 over an RBA line and gate it into the most significant bit position of the agent set address register in block 314.

The next character received into the receive character buffer in circuit 92 is the address character ID2 of the particular agent set 74 which has been selected by the computer 72 to receive the current message. During this character time (ID2), the receive control and sequencer 156 gnerates a signal on an SIDB line (FIG. 4B) to the agent set address register in circuit 314 which, together with the receive character clock RCK (FIG. 4A), transfer or gate the five least significant bits of the agent set address character ID2 from the receive character buffer in circuit 92 over lines RBA-E into the five least significant bit positions of the agent set address register in block 314 (FIG. 4B) and also place the RSC into the ID2 mode. The agent set address register in circuit 314 is a six-bit storage register which now contains the full six-bit agent set address character ID2. This character in the address register in circuit 314 is decoded by a decoder in that circuit which utilizes the three most significant bits of the address character as one group, and the three least significant bits of the address character as a second group to form a two-level octal decode network.

In one form, the decoder in circuit 314 may consist of 16 logic gates which are assembled to provide the eight conditions of the higher and lower order halves of the register in circuit 314 in double octal notation. The signals from the decoder in block 314 are used directly within the several sets of agent set interface circuits 214 (FIG. 4B), as will appear shortly hereafter, for selecting the proper agent set to acknowledge. Thus the decoder in block 314 is an 8 x 8 decoder having 16 output lines so that one of the 64 addresses (63 agent sets and the test buffer 90) is uniquely determined by two of the 16 output lines, one from the higher order group, or most significant bit group, labeled RMSA-H in FIG. 4B, and one from the lower order group, or least significant bit group, labeled RLSA-H. As will appear shortly hereafter, each one of the eight lines RMSA-H is connected to a different one of the interface circuits 214–1 to 214–8 while all eight of the lines RLSA-H are connected to each interface circuit 214–1 to 214–8.

The receive control and sequencer 156 raises its receive acknowledgement line RACK (see also FIG. 16) and the change in signal level thereon is transmitted to all the interface circuits 214 (FIG. 4B). It may be noted again at this time that the agent sets associated with the interface groups 214–1 to 214–8 are further identified individually in numerical sequence in the particular interface group blocks with which they are associated. Thus the interface block 214–1, for example, is associated with the test buffer 90 and agent sets #1 to #7 inclusive which are listed numerically therein. Similarly, the interface block 214–8 lists the last eight agent sets and identifies them individually in numerical sequence from #56 to #63. Each of the individual agent sets #1 to #63, and also the test buffer 90, are further identified by two letters in parentheses. Thus, agent set #1, for example, whose number is listed in interface block 214–1, is further identified by the notation (AB) which also appears as part of each of the specific signal line notations that are included by the bracket 316.

Since all the interface circuits 214 are similar, only the circuits for one interface group 214–1 have been illustrated and will be described, and these are shown in FIGS. 12, 13, 14 and 15.

Assuming that agent set #1 is the agent set which is to receive the message from the computer 72, selection of this agent set and transmitting the receive acknowledge signal over its receive acknowledge line RA(AB) are accomplished by applying the receive acknowledge signal RACK from the receive control and sequencer 156 to an AND gate 318 (FIG. 13) and by applying one of the two decodes $\overline{RMSA}$ from the decoder in block 314 to the AND gate 318 through an inverter 320. The output of the AND gate 318 is applied to an inverter 322 whose output provides one of the inputs to an AND gate 324, the other of whose inputs is supplied by the second decoded signal RLSB from the decoder circuit 314. Through an inverter 326 and a buffer 328, the output of the AND gate 324 raises the signal level of the receive acknowledge line RA(AB) of agent set #1. This line remains raised until the last character is transmitted to this agent set, as will appear shortly, except that during the transmission of a field identifier character FID, the RACK line and hence the RA(AB) line, which carries the same signal, are dropped for one character time (FIG. 16). Negation of the RACK signal during transfer of the FID character allows the agent set to process data more effectively.

After the RSC raises the receive acknowledge line RA(AB), as described above, it generates and sends receive shift pulses over the receive shift line RS(AB) of selected agent set #1. These pulses are synchronous with the serial clock receive pulses SCR from the data set 78, and are generated by the receive control and sequencer 156 on its receive shift line RSHT (FIGS. 4B and 16) which is common to all the interface circuits 214. Thus, receive shift pulses $\overline{RSHT}$ (FIG. 14) are applied to an input terminal 330 of a shift driver circuit 332 to obtain the receive shift pulses at the output terminal 334 for transmission on the receive shift line RS(AB) of selected agent set #1.

The RSC goes into the Message mode and the data characters which are transferred into the receive character buffer in circuit 92 from the computer 72 are shifted from the receive character buffer into the receive control and sequencer 156 over the receive data line RCDAT (FIG. 4A) by the receive bit clock RBK and then transferred or gated by the receive control and sequencer 156 to its output receive data line RDAT (FIG. 4B) which is common to all the interface circuits 214. Upon detecting the first data character received from the receive character buffer in circuit 92, the receive control and sequencer 156 goes into the message mode so that it can sense the presence of an end-of-message character EOM whenever such a character appears in the receive character buffer in circuit 92.

The message data on the receive data line RDAT out of the receive control and sequencer 156 is applied to an input terminal 336 (FIG. 14) of a data driver circuit 338 and the resulting signal data at the output terminal 340 transmitted to the selected agent set #1 over its receive data line RD(AB). The selected agent set uses the raised signal level on its receive acknowledge line RA(AB) and the shift pulses on its receive shift line RS(AB) to receive or shift into its system the data over its receive data line RD(AB).

The receive acknowledge line RA(AB) of selected agent set #1 remains raised until the last data character is transmitted to it, except, as mentioned previously, that during the transmission of an FID character the RA(AB) line is dropped for one character time.

Upon receipt of an end-of-message character EOM in the receive character buffer in circuit 92 from the data processor 72, the end-of-message character is decoded by the decoder in circuit 92, and the resulting decode transmitted to the receive control and sequencer 156 over the DEOM line, thereby causing the receive unit 84 to return to the idle mode.

Poll messages transmitted by the computer 72 are addressed to a specific remote scanner and control unit 70 and consist of a two-character sequence which includes a start-of-poll character POL and a specific RSC address character ID1.

The start-of-poll character POL is transmitted first and is received into the receive character buffer in circuit 92. The POL character is decoded by the decoder in circuit 92 and the resulting decode transmitted to the receive control and sequencer 156 over the DSOP line, whereupon the receive control and sequencer 156 goes into the poll mode to sense the next character which is the RSC address character ID1.

The ID1 character of the two-character sequence is next transmitted into the receive character buffer in circuit 92, decoded by the decoder in that circuit and the resulting decode transmitted to the receive control and sequencer 156 over the DRID line and to the transmit control and sequencer 158 over the DPID line. The receive control and sequencer 156 responds to the two-character poll message by generating a signal over an SPID line to the transmit control and sequencer 158 to sample the decoded poll identification character DPID, and then returns to its previous mode. The transmit control and sequencer 158 transmits a signal over a TPST line to an inverter 341 (FIG. 7) whose output signal serves to preset the transmit bit counter 162.

The transmit control and sequencer 158 normally is inactive. Receipt of coincident signals from the receive control and sequencer 156 over the SPID and DPID lines activates the transmit control and sequencer 158 which in turn activates its RTSA line to the communications data set interface 98 causing it to send a request-to-send signal RTS to the data set 78 (FIGS. 2–4). In response to the request-to-send signal RTS, the data set 78 turns on its carrier signal to the data set 80 (FIG. 1). Upon receiving a clear-to-send signal CTS from the data set 78, the interface circuit 98 (FIG. 4A) will transmit the corresponding signal CTSA to the transmit control and sequencer 158, whereby the logic circuitry of the transmit control and sequencer 158 and of the transmit encoder 94 cause the generation and transmission of three synchronous idle characters SYN to the computer 72, thereby enabling the computer 72 to synchronize on these characters. The number of SYN characters transmitted to the computer 72 is merely illustrative of one mode of operation and may be varied in different communications systems.

The generation of the three SYN characters is accomplished by the transmit control and sequencer 158 generating three corresponding signals over its ILAB line to the transmit encoder 94 which generates the SYN characters in a serial bit stream over an EDAT line to the transmit character buffer and parity check circuit 96 in which they are gated to the SDA line for transmission to the computer 72.

During the transmission of the last SYN character, a scan counter in block 118 (FIG. 4B) is enabled by count pulses from the transmit control and sequencer 158 over a CSC line, and agent set requests for service are sought by the transmit control and sequencer 158 by sensing their request lines RQ.

The scan counter in block 118 is a six-bit sequential counter which is incremented by count signals over the CSC line. Reception of the signal by the transmit control and sequencer 158 over the SPID line (FIG. 4A) causes it to generate a signal on an SCRNT line (FIG. 4B) to preset the scan counter in block 118 to the first octal address position 00. At the proper time in the control cycle, a count control signal is generated in the logic circuitry of the transmit control and sequencer 158 and allows the scan counter in block 118 to increment, providing there is "no comparison" between the particular agent set request line RQ which is presently being sensed and the state of the scan counter in circuit 118. Comparison inhibits such stepping of the scan counter in circuit 118 to allow transmission of the agent set's messages. The control logic also prevents the carryover of count 63 to count zero by the scan counter in circuit 118.

Selection of request and other lines from the various agent sets 74 that are ready to transmit to the computer 72 is made through gates driven by a two-level matrix decoder in circuit 118. The decoder in circuit 118 is similar to the decoder in circuit 314 and consists of two sets of eight logic gates. One group of eight gates similarly uses the various signal combinations of the three higher order stages in the scan counter in block 118 for obtaining signals on the eight decode lines TMSA–H while the remaining group of eight gates uses the three lower order stages in the scan counter in block 118 for obtaining signals on the eight decode lines TLSA–H. Thus, the decoder in block 118 is also an 8 x 8 decoder having 16 output lines so that an agent set 74, or the test buffer 90, which has its request line RQ raised, indicating that it is ready to transmit to the computer 72, is uniquely determined by two of the 16 output lines, one from the higher order group TMSA–H and one from the lower order group TLSA–H.

The scan counter in block 118 is incremented by count pulses from the transmit control and sequencer 158 on the CSC line, as mentioned previously, until its output state corresponds to the address code of either the test buffer 90 or the first agent set 74 which has its request line RQ raised. This condition will be sensed by the transmit control and sequencer 158 by detecting the change in signal level on the appropriate one of the eight transmit request lines in the group TRQA–H, each of which is connected to one of the eight interface circuits 214–1 to 214–8. Assuming that agent set #1 has its request line RQ(AB) raised to indicate that it desires to transmit to the computer 72, this condition will be detected by the transmit control and sequencer 158 by sensing the change in signal level on the TRQA line. The manner of detecting the status of the activated TRQA line will now be described.

Figure 15:
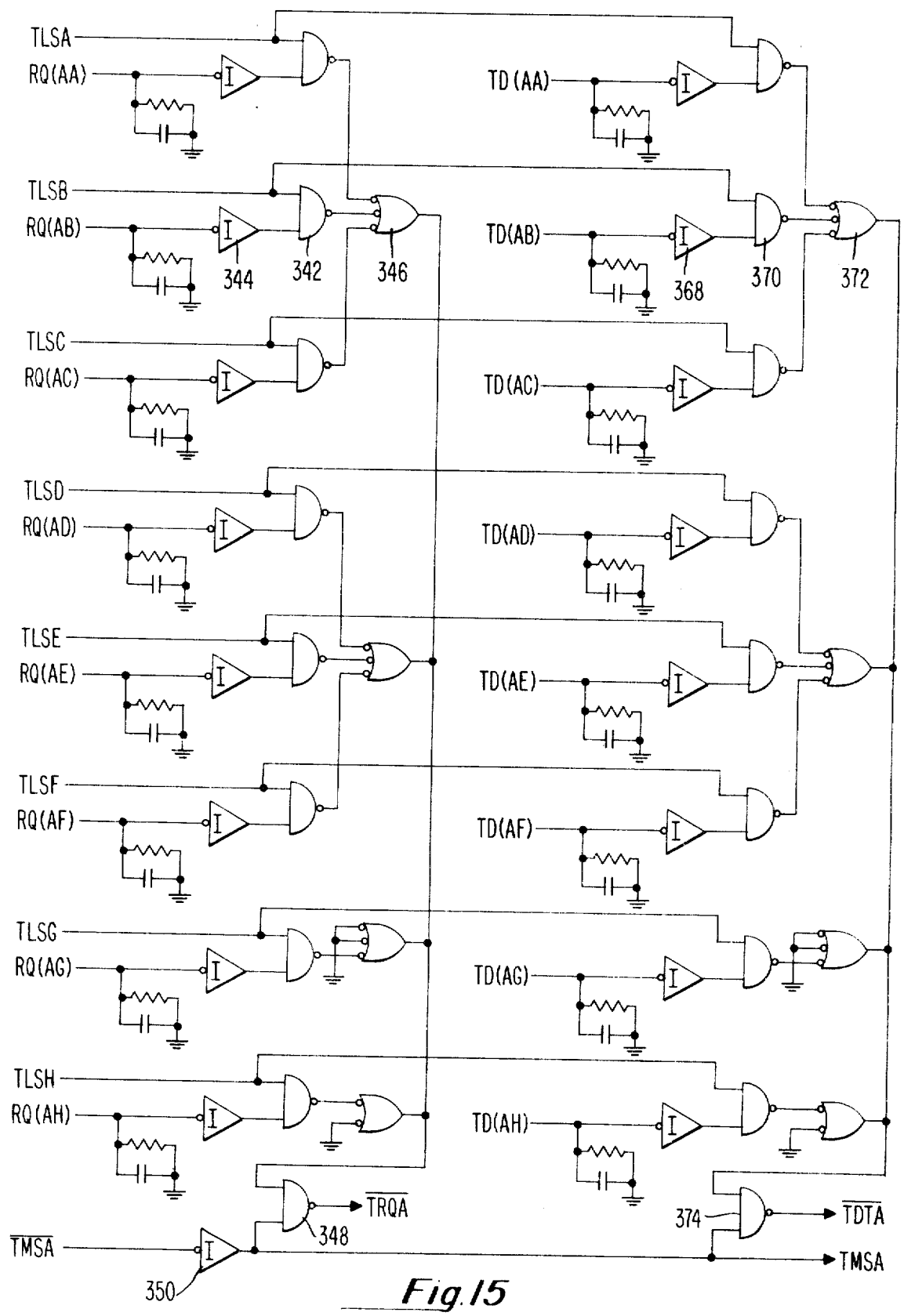
FIG. 15 is a schematic diagram of additional driver circuits for the same agent set interface group shown in FIG. 4B.

As shown in FIG. 15, the signal on the activated request line RQ(AB) from agent set #1 is applied as one input to an AND gate 342 through an inverter 344, the other input to the AND gate 342 being the decoded signal TLSB from the decoder in circuit 118. The output of the AND gate 342 is applied to an OR gate 346 whose output signal provides one of the inputs to an AND gate 348, the other input to which is obtained from the signal on the decoded line $\overline{TMSA}$ from the decoder in circuit 118 through an inverter 350 to obtain the change in signal level on the transmit request line $\overline{TRQA}$ at the output of the AND gate 348. By means of the change in signal level at the output of the gate 348, the transmit control and sequencer 158 senses on the TRQA line that agent set #1 has its request line RQ(AB) high and is ready to transmit to the computer 72.

The signal level on the transmit acknowledge line TA(AB) of the requesting agent set #1 is also raised and this is followed by the receipt of shift pulses on its transmit shift line TS(AB). This is accomplished as follows:

A transmit acknowledge signal on the TACK line (FIGS. 4B and 17) from the transmit control and sequencer 158 is applied as one input to an AND gate 352 (FIG. 12), the other input of which is the decoded signal on the TMSA line from the decoder in circuit 118. The output of the AND gate 352 is applied to an inverter 354 whose output provides one of the inputs to an AND gate 356, the other of whose inputs is the decoded signal on the TLSB line from the decoder in circuit 118. The output of the AND gate 356 is applied to an inverter 358 connected to a buffer 360 to obtain the change in signal level, at the output of the buffer 360, on the transmit acknowledge line TA(AB) of agent set #1. Transmit shift signals $\overline{TSHT}$ are transmitted by the transmit control and sequencer 158 to an input terminal 362 (FIG. 14) of a shift driver circuit 364 and the resulting shift pulses at the output terminal 366 of the circuit 364 transmitted to the requesting agent set #1 on the transmit shift line TS(AB). The requesting agent set #1 uses the changed signal level on its transmit acknowledge line TA(AB) and the shift pulses on its transmit shift line TS(AB) to shift out its messages to the computer 72 over its transmit data line TD(AB), as will appear more fully hereinafter.

The eight agent set interface circuits 214–1 to 214–8 transmit data to the computer 72 over individual transmit data lines TDTA–H (FIG. 4B). Thus, the agent sets and the test buffer, for example, associated with the interface 214–1 use the TDTA line for transmitting data. Similarly, the agent sets associated with interface 214–8 transmit their data over the TDTH line. The manner of transmitting data from the transmit data line TD(AB) of the illustrative agent set #1 to the transmit data line TDTA, which is common to the devices associated with interface 214–1, will now be described.

The signal on the transmit data line TD(AB) of requesting agent set #1 is applied to the input of an inverter circuit 368 (FIG. 15) whose output forms one of the inputs to an AND gate 370. The decoded signal on the TLSB line from the decoder in circuit 118 is applied to the other input of the AND gate 370. The output of the AND gate 370 is applied to an OR gate 372 whose output is connected to an input terminal of an AND gate 374. The output from the inverter 350, derived from the decoded signal on the TMSA line from the decoder in circuit 118, is connected to the other input terminal of the AND gate 374. The output of the AND gate 374 is connected to the transmit data line TDTA, over which the message data will be transmitted from requesting agent set #1 for ultimate transmission to the computer 72.

The active status of the request line RQ(AB) of agent set #1 stops the scan counter in block 118 on that agent set's address count and initiates the control logic in the transmit control and sequencer 158 for the formation of the three-character message header. As mentioned previously, this header is composed of a start-of-message character SOM, and RSC address character ID1 and an agent set address character ID2.

Formation of the start-of-message character SOM is initiated by a signal over an SMEA line (FIG. 4A) from the transmit control and sequencer 158 to the transmit encoder 94. Encoder 94 generates the start-of-message character SOM and transmits it over the EDAT line to the circuitry in block 96 in which it is gated to the send data line SDA for transmission to the computer 72.

The next character in the three-character header to be formulated is the address character for this RSC 70. Formulation of this character is initiated by a signal on an RSIA line from the transmit control and sequencer 158 to the transmit encoder 94. In conjunction with the signal on the RSIA line, the sixth bit, or state of the sixth stage SCF, from the scan counter in circuit 118 is transferred to the transmit encoder 94 to become the first or least significant bit $b_1$ of the RSC address character ID1. The next four significant bits $b_2$–$b_5$ of the ID1 character are taken from the four address selection switches S1–S4 (FIG. 11) which have their transmit poles TP set to the appropriate logic level of ground or +3.6 volts. The seventh, or parity, bit $b_7$ for this RSC address character ID1 is obtained in the logic of the transmit encoder 94 (FIG. 4A) which examines the marked bit from the fifth address selection switch S5 on the switch line SAP (FIG. 11) and the bit from the sixth stage SCF of the scan counter in block 118, and then adds the appropriate parity bit $b_7$ to the ID1 character to obtain odd parity. The RSC address character ID1 is transmitted over the EDAT line and similarly gated by the gating network in block 96 to the SDA line.

The third character of the three-character header is the agent set address character ID2. This is taken from the scan counter in circuit 118 by transmitting the five least significant stages SCA-E to the transmit encoder 94 which adds an appropriate parity bit to obtain odd parity. The agent set address character ID2 is then similarly transmitted over the EDAT line and gated by the gating network in block 96 to the send data line SDA for transmission to the computer 72.

As the logic in the transmit encoder 94 generates the agent set address character ID2, the transmit control and sequencer 158 allows the first data character to be shifted through the logic in the particular interface circuit 214 and into the transmit character buffer in block 96 via the appropriate one of the eight transmit data lines TDTA-H. Thus, in the case of the illustrative agent set #1, the first data character from this agent set is shifted through the logic in interface 214–1 and into the transmit character buffer in block 96 via the TDTA line. This character is shifted bit-serially through the transmit character buffer by the transmit bit clock TBK and gated to the send data line SDA by the same gating network which is used for transferring encoded characters from the EDAT line to the send data line SDA.

The circuitry in block 96 includes the transmit character buffer which is a seven-stage storage register, and parity checking circuitry which examines the parity of each data character that is shifted into the transmit character buffer over the individual transmit data lines TDTA-H. If the parity checking circuit in block 96 detects an error in parity in any character, it transmits a parity error signal over a TPEA line to the transmit encoder 94 which then generates and transmits in the place of the erroneous character a parity error character PEI and transmits it to the computer via the gating network in block 96 and the send data line SDA.

Succeeding data characters are shifted until agent set #1 deactivates its request line RQ(AB) at the end of the message. This condition will be detected by the transmit control and sequencer 158 which will then transmit a signal to the transmit encoder 94 over an EOMA line to initiate the generation of an end-of-message character EOM. The EOM character is accordingly generated by the transmit encoder 94 and appended to the last data character shifted through the transmit character buffer in circuit 96 to the send data line SDA.

During transmission of the end-of-message character EOM, the scan counter in block 118 is again enabled and additional requests are sought. If a second request is found a new header is fabricated and the above sequence is repeated. Failure of the scan counter in block 118 to find requests, or additional requests, during its sweep through the 64 address positions, forces the transmit control and sequencer 158 to initiate the generation of an end-of-transmission character EOT by sending a signal on an EOTA line to the transmit encoder 94 to have it encode and transmit this character to the computer 72. This is followed by the transmit control and sequencer 158 deactivating its RTSA line which results in deactivation of the request-to-send line RTS to the data set 78. The entire procedure is repeated each time a two-character poll message is received which contains the proper RSC address character.

It may be desirable in certain applications to restrict transmissions of any one agent set 74 to a predetermined number of data characters during any transmit sequence of the RSC 70. This has been done in the illustrated embodiment of the invention by means of a timing device 376 (FIG. 4A) which is started by a signal from the transmit control and sequencer 158 on a DTRA line. In the illustrated embodiment of the invention, the timing device 376 is a four-second timer designed to restrict transmissions of any one agent set 74 to approximately 1300 data characters during any transmit sequence of the RSC. Expiration of the timer 376 results in a transmit time-out signal on a TTO line to the transmit control and sequencer 158 which serves to terminate the message in process. The scan counter in circuit 118 is then allowed to increment and other requests are sought until the full scan cycle is completed.

The test buffer 90 (FIG. 4B) comprises a seven-bit storage register which acts as an input/output unit, similar to the agent sets 74, and which is capable of receiving one-character messages from the data processor 72 and retransmitting the same back to the processor. The test buffer 90 is connected at the first position to interface circuit 214–1 and is assigned "agent set" address 00. The several lines (RA, RS, etc.) from the test buffer 90 to the interface circuit 214–1 are further identified by the additional notation (AA).

The test buffer 90 is normally in a receive mode. This may have been caused by a power reset signal on a PRSET line. When the three-character header of a message from the computer 72, which is addressed to the test buffer 90, is received into the receive character buffer in circuit 92, the all-zero address character of the test buffer 90 will then be transferred to the address register in circuit 314 in a manner similar to that described previously, and similarly decoded by the decoder in circuit 314 to select the receive acknowledge line RA(AA) and receive shift line RS(AA) of the test buffer 90. The logic in the receive control and sequencer 156 similarly generates a signal on its receive acknowledge line RACK, and shift signals on its receive shift line RSHT, and these are transmitted to the test buffer 90 over its RA(AA) and RS(AA) lines, respectively, and used by the test buffer 90 to clock in the seven receive data bits of the one-character message from the receive character buffer in circuit 92 into the storage register of the test buffer 90.

The test buffer 90 also includes a three-stage bit counter which counts each bit as it is received into the storage register of the test buffer 90. When the bit counter in the test buffer 90 has attained a count of seven, signifying receipt of the seven-bit character into the storage register in the test buffer, the bit counter will cause the test buffer to revert to the transmit mode and to raise its request line RQ(AA). At the next poll message sequence, the transmit control and sequencer 158 acknowledges this request by generating a signal over the transmit acknowledge line TA(AA) of the test buffer 90, and at the proper time sends shift pulses over the transmit shift line TS(AA) of the test buffer 90, both of which are used by the test buffer to step out the last character received by the test buffer for retransmission back to the computer 72. This retransmission is in effect an acknowledgement of the original message. The test buffer 90 then reverts to the receive mode and awaits further messages from the computer 72.

The test buffer 90 also contains flip-flops which are operated by the receipt of one-character messages containing one of the characters W, X, Y or Z for controlling two status indicators, not shown. Receipt of these characters may operate the indicators as follows:

W—Set flip-flop to Condition W(CDW) to turn on status 1 indicator

X—Reset flip-flop to turn off status 1 indicator

Y—Set flip-flop to Condition Y(CDY) to turn on status 2 indicator

Z—Reset flip-flop to turn off status 2 indicator

In the illustrated embodiment of the invention, status 1 indicator is regarded as a spare indicator and is reserved for various tests or other uses, as may be required.

Status 2 indicator, however, is used regularly in the present embodiment of the invention. When status 2 indicator is turned on, the scan counter is circuit 118 is inhibited so that only the test buffer 90 is serviced by the transmit unit 86 of the RSC. This feature is intended for use during diagnostics; it allows two-way communication by the computer 72 with the RSC 70 without interference with operational messages. When the operator applies power to the RSC, the power clear turn-on pulse resets the status indicators and initializes the receive mode for the test buffer 90.

A character transmitted to the test buffer 90 with a parity error does not affect the status indicators, and is returned to the transmit character buffer in circuit 96. The RSC substitutes the PEI character for the error character, as described previously.

While there has been shown and described a specific communications terminal described as a remote scanner and control unit, to exemplify the principles of the invention, it is understood that this is but one embodiment of the invention and that the invention is capable of being constructed in a variety of modifications without departing from its true spirit and scope. Accordingly, the invention is not to be limited by the specific communications terminal disclosed, but only by the subjoined claims.

We claim:

1. A communications system comprising a plurality of communications terminals connected in parallel with each other and individually in series with an input channel from a data processor, each terminal receiving multibit character code information over said channel from said data processor and routing the information to a selected one of a plurality of devices, each device capable of accepting said information without being polled and each requiring at least a receive acknowledge signal for receiving said information; each communications terminal monitoring all information on said channel and selecting only that information directed to a device connected to said terminal, and comprising a storage register coupled to said input channel receiving an address character code from said data processor containing the coded address of said selected device, means for operating on two groups of bits of said address character code for decoding said character code to obtain two output signals, control means operative to provide a preliminary acknowledge signal, a gate and driver circuit connected to receive said two output signals and said preliminary acknowledge signal generating and transmitting said receieve acknowledge signal to said device, and means including said storage register for receiving and routing said informatiton to said device immediately following the receipt of said address character code by said storage register.

2. A communications system comprising a plurality of communications terminals connected in parallel with each other and individually in series with an input channel from a data processor, each terminal receiving multibit character code information over said channel derived from said data processor and routing the information to a selected one of a plurality of devices, each device requiring a receive acknowledge signal and receive shift pulses for receiving said information and each terminal receiving first clock pulses from a source coupled between said terminal and said input channel which are synchronous with said information; each communications terminal monitoring all information on said channel and comprising first storage means coupled to said input channel for receiving an address character code derived from said data processor containing the coded address of said selected device, second storage means coupled to said input channel for receiving said information, means for operating on two groups of bits of said address character code for decoding said character code to obtain two output signals, control means operative to provide a preliminary acknowledge signal and preliminary shift pulses, first circuit means including a gate and driver circuit connected to receive said two output signals and said preliminary acknowledge signal for generating and transmitting said receive acknowledge signal to said device, second circuit means connected to receive said preliminary shift pulses for generating and transmitting said receive shift pulses to said device, third circuit means connected between an output terminal of said second storage means and said selected device, and a source of second clock pulses synchronous with said first clock pulses for shifting the information from said second storage means to said selected device through said third circuit means immediately following the receipt of said address character code by said first storage means.

3. A communications system comprising a data processor, a plurality of devices each requiring at least a receive acknowledge signal for receiving multibit character code information from said data processor, and a plurality of communications terminals connected in parallel with each other and individually in series with an input channel from said data processor; each terminal selectable for receiving said multibit character code information over said channel and routing the multibit character code information to a selected one of said devices and operative to monitor all said information on said channel and comprising a first storage register coupled to said input channel receiving two address character codes from said data processor, one of said codes containing the address of the communications terminal and the other of said codes containing the address of a selected one of said devices, first decoding means for decoding the communications terminal address to obtain a decoding signal, a second storage register coupled to said first storage register, a source of clock pulses, control means connected to receive said decoding signal and cooperating with said clock pulses for transferring said selected device address code to said second storage register and operative to provide a preliminary acknowledge signal, second decoding means for operating on two groups of bits of said selected device address code for decoding said selected device address to obtain two output signals, first circuit means including a gating network connected to receive said two output signals and said preliminary acknowledge signal for generating and transmitting said receive acknowledge signal to said selected device, and means including said first storage register for receiving and routing said informatiton to said selected device immediately following the receipt of said two address codes by said first storage register.

4. A communications system comprising a data processor, a plurality of devices each requiring at least a transmit acknowledge signal for transmitting data to said data processor and each having a request line which is activated when the device has been conditioned to transmit, and a plurality of communications terminals connected in parallel with each other and individually in series with a channel connected to said data processor, each terminal controlling the transmissions of a group of said devices, all communications terminals operative to concurrently monitor all information on said channel and each operative to accept only information addressed to it and to reject information addressed specifically to other communications terminals, each communications terminal also comprising storage means coupled to said channel for receiving two character codes from data processor, one of said codes being a poll code and the other of said codes containing the address of a communications terminal, means for decoding said character codes, control means activated by the output of said decoding means if said address is the address of the particular communications terminal for initiating a request-to-send signal to said data processor and responsive to the receipt of a clear-to-send signal from said data processor for serially sensing the status of said request lines and for generating a preliminary signal if any request line is found to be activated, means activated by said activated control means for generating a multibit character code containing the address of the requesting device whose request line is activated, second decoding means for operating on two groups of bits of said requesting device address to obtain two output signals, a gating network connected to receive said two output signals and said preliminary signal for generating and transmitting said transmit acknowledge signal to said requesting device, and means for routing transmit data from said requesting device to said data processor immediately following the receipt of said two character codes by said storage means.

5. A communications system comprising a data processor, a plurality of devices each having an address code and requiring a transmit acknowledge signal and transmit shift pulses for transmitting data to said data processor and each having a request line which is activated when the device has been conditioned to transmit, and a plurality of communications terminals connected in parallel with each other and individually in series with an input channel from said data processor each addressable by an address code and each controlling the transmissions of a group of said devices, each communications terminal monitoring all information on said channel and selecting only that information directed to said terminal, and comprising first storage means coupled to said input channel for receiving two character codes over said channel from said data processor, one of said codes being a poll code and the other of said codes containing the address of the communications terminal, first decoding means for decoding said character codes, control means, scanning means incremented by count pulses from said control means for sequentially providing individual output states each corresponding to a multibit address code of one of said devices, second decoding means for operating on two groups of bits of each multibit address code to obtain two output signals, said control means being activated by the output of said first decoding means for initiating a request-to-send signal to said data processor and by the receipt of a clear-to-send signal from said data processor for sensing through a first network the status of said request lines and generating a preliminary signal and preliminary shift pulses when the output state of said scanning means corresponds to the address code of a requesting device whose request line is found to be activated, first circuit means arranged to receive said preliminary signal and said two output signals for generating and transmitting said transmit acknowledge signal to said requesting device, second circuit means arranged to receive said preliminary shift pulses for generating and transmitting said transmit shift pulses to said requesting device, a gating network connected to receive said two output signals and data bit signals from an output terminal of said requesting device for generating transmit data, and means for shifting and routing said transmit data to said data processor.

6. A communications system according to claim 5 wherein said each communications terminal is characterized further by the provision of manually operable switching means settable to an output state corresponding to the coded address of the communications terminal, and wherein transmissions from each requesting device to said data processor are accompanied by the address character code of the communications terminal and the address character code of the requesting device, said each communications terminal further including an encoding means responsive to a signal generated by said control means as the result of its sensing the activated request line of said requesting device for encoding from the output state of said switching means the address character code of the communications terminal and from the corresponding output state of said scanning means the address character code of said requesting device, and means for transmitting said address character codes to said data processor.

7. A communications system comprising a data processor, a plurality of input/output devices capable of accepting data without being polled and each being addressable by an address character code and requiring at least a receive acknowledge signal for receiving data from said data processor and requiring at least a transmit acknowledge signal for transmitting data to said data processor and each having a request line which is activated when the device has been conditioned to transmit, and a plurality of communications terminals connected in parallel with each other and individually in series with an input channel from said data processor and each for routing data to a selected one of a group of said devices and for controlling transmission of data from said group of devices, each communications terminal monitoring all information on said channel and selecting only that information directed to said terminal or to a device connected to said terminal and being addressable by an address character code and comprising a first storage register coupled to said input channel for receiving at predetermined times first, second, third and fourth character codes from said data processor, each of said first and fourth character codes being the address character code of the communications terminal, said second character code being the address character code of a selected one of said group of devices and said third character code being a poll code, first decoding means for decoding said first, third and fourth character codes to obtain respectively first, second and third decoding signals, a second storage register, a source of clock pulses, first control means coupled to receive said first decoding signal and cooperating with said clock pulses for transferring said selected device address code to said second storage register and operative to provide a preliminary receive acknowledge signal, second decoding means for decoding said transferred selected device address code, first circuit means connected to receive the output of said second decoding means and said preliminary receive acknowledge signal for generating and transmitting said receive acknowledge signal to said selected device, means including said first storage register for receiving and routing data from said data processor to said selected device immediately following the receipt of said first and second character codes by said first storage register, said control means being responsive to said second and third decoding signals for providing an output signal, second control means, scanning means incremented by count pulses from said second control means derived from said clock pulses for sequentially providing individual output states each corresponding to the address code of one of the devices of said group, third decoding means for decoding said output states, said second control means being activated by the output signal of said first control means for initiating a request-to-send signal to said data processor and by the receipt of a clear-to-send signal from said data processor for sensing the status of said request lines and generating a preliminary transmit acknowledge signal when the output state of said scanning means corresponds to the address code of a requesting device whose request line is found to be activated, second circuit means arranged to receive said preliminary transmit acknowledge signal and the output of said third decoding means for generating and transmitting said transmit acknowledge signal to said requesting device, and means for routing transmit data from said requesting device to said data processor immediately following the receipt of said third and fourth character codes by said first storage register.

8. A communications system comprising a digital computer, a plurality of input/output devices each having an address character code and requiring a receive acknowledge signal and receive shift pulses for receiving binary coded data from said digital computer and requiring a transmit acknowledge signal and transmit shift pulses for transmitting binary coded data to said digital computer and each having a request line which is activated when the device has been conditioned to transmit, and a plurality of communications terminals connected in parallel with each other and individually in series with an input channel from said digital computer and each for routing data to a selected one of a group of said devices and for controlling transmisison of data from said group of devices, each communications terminal monitoring all data on said channel and being addressable by an address character code and comprising a first storage register coupled to said input channel for receiving at predetermined times first, second, third and fourth character codes from said digital computer, each of said first and fourth character codes being the address character code of the communications terminal, said second character code being the address character code of a selected one of said group of devices and said third character code being a poll code, first decoding means for decoding said first, third and fourth character codes to obtain respectively, first, second and third decoding signals, a second storage register, a source of clock pulses, first control means coupled to receive said first decoding signal and cooperating with said clock pulses for transferring said selected device address code to said second storage register and operative to provide a preliminary receive acknowledge signal and preliminary receive shift pulses, second decoding means for decoding said transferred selected device address code, first circuit means connected to receive the output of said second decoding means and said preliminary receive acknowledge signal for generating and transmitting said receive acknowledge signal to said selected device, second circuit means responsive to said preliminary receive shift pulses for generating and transmitting said receive shift pulses to said selected device, means including said first storage register for receiving and routing data from said digital computer to said selected device immediately following the receipt of said first and second character codes by said first storage register, said first control means being responsive to said second and third decoding signals for providing an output signal, second control means, scanning means incremented by count pulses from said second control means derived from said clock pulses for sequentially providing individual output states each corresponding to the address code of one of the devices of said group, third decoding means for decoding said output states, said second control means being activated by the output signal of said first control means for initiating a request-to-send signal to said digital computer and by the receipt of a clear-to-send signal from said digital computer for sensing the status of said request lines and generating a preliminary transmit acknowledge signal and preliminary transmit shift pulses when the output state of said scanning means corresponds to the address code of a requesting device whose request line is found to be activated, third circuit means arranged to receive said preliminary transmit acknowledge signal and the output of said third decoding means for generating and transmitting said transmit acknowledge signal to said requesting device, fourth circuit means arranged to receive said preliminary transmit shift pulses for generating and transmitting said transmit shift pulses to said requesting device, and means for routing transmit data from said requesting device to said digital computer immediately following the receipt of said third and fourth character codes by said first storage register.

9. A communications network wherein a data processor transmits a bit-serially through a communications channel to a synchronizing terminal a stream of $m$-bit character codes including synchronizing character codes to be processed by said synchronizing terminal, apparatus for generating last bit count signals for use by said synchronizing terminal, each last bit count signal to be synchronous with the receipt of an $m$-bit character code, said apparatus comprising means for generating bit clock signals which are synchronous with the bits in said character codes, an $m$-bit storage register for receiving said character codes in succession, a bit counter incremented solely by said bit clock signals for providing a last bit count signal when it has received $m$ bit clock signals, means for decoding a predetermined number of synchronizing character codes in said storage register, and conditioning means coupled to receive the successive outputs of said decoding means and including means responsive to said bit clock signals for conditioning said bit counter so that each of its subsequent last bit count signals is synchronous with the receipt of the last bit of an $m$-bit character code received subsequently in said storage register.

10. A communications network wherein a data processor transmits bit-serially through a communications channel to a synchronizing terminal a stream of $m$-bit character codes including synchronizing character codes to be processed by said synchronizing terminal, apparatus for generating last bit count signals for use by said synchronizing terminal, each last bit count signal to be synchronous with the receipt of an $m$-bit character code, said apparatus comprising means for generating bit clock signals which are synchronous with the bits in said character codes, an $m$-bit storage register for receiving said character codes in succession, first and second bit counters incremented simultaneously and solely by said bit clock signals, said first bit counter providing a last bit count signal when it has received $m$-bit clock signals and said second bit counter providing an output signal when it has received $m$-bit clock signals, decoding means for successively decoding a sequence of synchronizing character codes in said storage register, a character counter adapted to provide an output signal when it has been incremented $n$ times, means responsive to each output of said decoding means and to each output signal of said second bit counter for incrementing said character counter, and means responsive to the output signal of said character counter and to an output signal of said second bit counter for conditioning said first bit counter so that each of its subsequent last bit count signals is synchronous with the receipt of the last bit of an $m$-bit character code received subsequently in said storage register, and wherein $n$ may or may not be equal to $m$.

References Cited
UNITED STATES PATENTS

| | | | |
|---|---|---|---|
| 3,058,659 | 10/1962 | Demmer et al. | 340—172.5 |
| 3,331,055 | 7/1967 | Betz et al. | 340—172.5 |
| 3,351,919 | 11/1967 | Milford | 340—172.5 |
| 3,396,372 | 8/1968 | Calvert | 340—172.5 |
| 3,407,387 | 10/1968 | Looschen et al. | 340—172.5 |
| 3,413,612 | 11/1968 | Brooks et al. | 340—172.5 |
| 3,413,448 | 11/1968 | Rosenblatt | 340—172.5 XR |

OTHER REFERENCES

IBM 7080 Data Processing System Reference Manual, A22–6560–1, December 1961, Poughkeepsie, N.Y., pp. 4, 6, 7, 16, 17, 21, 22 and 76. (Obtainable from IBM Corp., Customer Manuals, Dept. 298, Box 390, Poughkeepsie, N.Y.).

IBM 7080 Data Processing System Reference Manual (A22–6560–1) December 1961, pp. 26–28.

IBM 7080 Handbook, General Logis and Data Flow, Fig. 2.3–1 (Read) and Fig. 2.4–1 (Write)—(Manual available in A.U. 237, U.S. Patent System).

PAUL J. HENON, Primary Examiner

H. E. SPRINGBORN, Assistant Examiner